United States Patent
Nomura et al.

(10) Patent No.: US 10,894,907 B2
(45) Date of Patent: Jan. 19, 2021

(54) LATENT-HEAT STORAGE BODY MICROCAPSULES AND PROCESS FOR PRODUCING LATENT-HEAT STORAGE BODY MICROCAPSULES

(71) Applicant: NATIONAL UNIVERSITY CORPORATION HOKKAIDO UNIVERSITY, Sapporo (JP)

(72) Inventors: Takahiro Nomura, Sapporo (JP); Tomohiro Akiyama, Sapporo (JP); Nan Sheng, Sapporo (JP); Daiki Hanzaki, Sapporo (JP)

(73) Assignee: NATIONAL UNIVERSITY CORPORATION HOKKAIDO UNIVERSITY, Sapporo (JP)

(*) Notice: Subject to any disclaimer, the term of this patent is extended or adjusted under 35 U.S.C. 154(b) by 48 days.

(21) Appl. No.: 16/302,354

(22) PCT Filed: May 17, 2017

(86) PCT No.: PCT/JP2017/018587
§ 371 (c)(1),
(2) Date: Nov. 16, 2018

(87) PCT Pub. No.: WO2017/200021
PCT Pub. Date: Nov. 23, 2017

(65) Prior Publication Data
US 2019/0300770 A1     Oct. 3, 2019

(30) Foreign Application Priority Data
May 17, 2016   (JP) .................... 2016-098815

(51) Int. Cl.
*C09K 5/06* (2006.01)
*B22F 1/00* (2006.01)
(Continued)

(52) U.S. Cl.
CPC ............ *C09K 5/063* (2013.01); *B22F 1/0003* (2013.01); *C09K 5/06* (2013.01); *C09K 5/14* (2013.01);
(Continued)

(58) Field of Classification Search
CPC .. C09K 5/063; B32B 9/04; B32B 5/00; B32B 17/06; B32B 18/00; C23C 16/40; C23C 16/403
(Continued)

(56) References Cited

U.S. PATENT DOCUMENTS

| | | |
|---|---|---|
| 4,657,067 A | 4/1987 | Rapp et al. |
| 4,873,038 A | 10/1989 | Rapp et al. |

(Continued)

FOREIGN PATENT DOCUMENTS

| | | |
|---|---|---|
| CN | 102251234 A | 11/2011 |
| JP | 1-113486 A | 5/1989 |

(Continued)

OTHER PUBLICATIONS

Fukahori et al. "Thermal analysis of Al—Si alloys as high temperature phase-change material and their corrosion properties with ceramic materials", Applied Energy, 163, 2016, 1-8. Published online Nov. 12, 2015 (Year: 2015).*

(Continued)

*Primary Examiner* — Jane L Stanley
(74) *Attorney, Agent, or Firm* — Westerman, Hattori, Daniels & Adrian, LLP

(57) ABSTRACT

In the present invention, after a primary coating film is formed by boehmite treatment of the surface of a core particle in a solution comprising Al ions, a secondary coating film is formed by cooling the solution to the supersaturation temperature of the Al ions to cause deposition of a hydroxide of aluminum on the surface of the primary (Continued)

coating film, and an Al oxide film is formed on the surface of the core particle by heat treating the secondary coating film in an oxidizing atmosphere. Consequently, the shell is thickened by the amount of secondary coating film formed, so that the cyclic strength of the capsule can be secured and the composition change of the PCM in the production process is remarkably suppressed.

5 Claims, 16 Drawing Sheets

(51) Int. Cl.
  C22C 21/02 (2006.01)
  C23C 28/04 (2006.01)
  F28D 20/02 (2006.01)
  C09K 5/14 (2006.01)
  C23C 28/00 (2006.01)
  C23C 20/08 (2006.01)
(52) U.S. Cl.
  CPC .............. *C22C 21/02* (2013.01); *C23C 20/08* (2013.01); *C23C 28/00* (2013.01); *C23C 28/04* (2013.01); *F28D 20/02* (2013.01); *B22F 2301/052* (2013.01); *B22F 2302/253* (2013.01); *Y02E 60/14* (2013.01)
(58) Field of Classification Search
  USPC ............................................ 252/71; 428/335
  See application file for complete search history.

(56) References Cited

U.S. PATENT DOCUMENTS

| 6,572,991 | B1 | 6/2003 | Ruppi | |
| 10,563,108 | B2* | 2/2020 | Akiyama | C09K 5/06 |
| 2011/0017659 | A1* | 1/2011 | Aktas | C23C 26/00 |
| | | | | 210/500.1 |
| 2012/0141783 | A1* | 6/2012 | Hoehn | C23C 16/403 |
| | | | | 428/335 |
| 2012/0148845 | A1 | 6/2012 | Kouyama et al. | |
| 2015/0027543 | A1* | 1/2015 | Aktas | H01L 51/448 |
| | | | | 136/263 |
| 2017/0044415 | A1 | 2/2017 | Akiyama et al. | |
| 2018/0333774 | A1* | 11/2018 | Christensen | C01B 3/0031 |

FOREIGN PATENT DOCUMENTS

| JP | 6-50681 A | 2/1994 |
| JP | 10-238979 A | 9/1998 |
| JP | 11-23172 A | 1/1999 |
| JP | 2000-38602 A | 2/2000 |
| JP | 2001-254177 A | 9/2001 |
| JP | 2001-294492 A | 10/2001 |
| JP | 2004-149847 A | 5/2004 |
| JP | 2012-111825 A | 6/2012 |
| JP | 2012-140600 A | 7/2012 |
| WO | 2015/031788 A1 | 3/2015 |
| WO | 2015/162929 A1 | 10/2015 |

OTHER PUBLICATIONS

He et al. "Structural and phase change characteristics of inorganic microencapsulated core/shell Al—Si/Al2O3 micro-particles during thermal cycling", Ceramics International, 41, 2015, 10689-10696. Published online May 13, 2015 (Year: 2015).*
He et al. "Inorganic microencapsulated core/shell structures of Al—Si alloy micro-particles with silane coupling agent", Ceramics International, 40, 2014, 6865-6874. published online Dec. 13, 2013 (Year: 2013).*
Li et al. "Facile synthesis of Al@Al2O3 microcapsule for high-temperature thermal energy storage", ACS Sustainable Chem. Eng., 2018, 6, 13226-13236. Published Aug. 29, 2018 (Year: 2018).*
Nomura et al. "Microencapsulation of metal-based phase change material for high-temperature thermal energy storage", Scientific Reports, 5, article 9117, p. 1-8. Published Mar. 13, 2015 (Year: 2015).*
International Search Report dated Jun. 20, 2017, issued in counterpart International Application No. PCT/JP2017/018587, with English Translation. (5 pages).
International Preliminary Report on Patentability (Form PCT/IPEA/409) of International Application No. PCT/JP2017/018587 dated May 28, 2018. (4 pages).

* cited by examiner

[FIG.1]
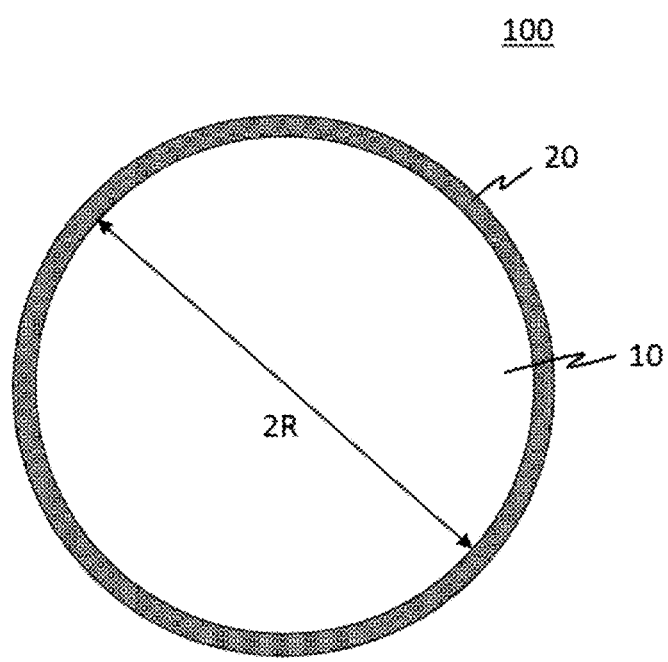

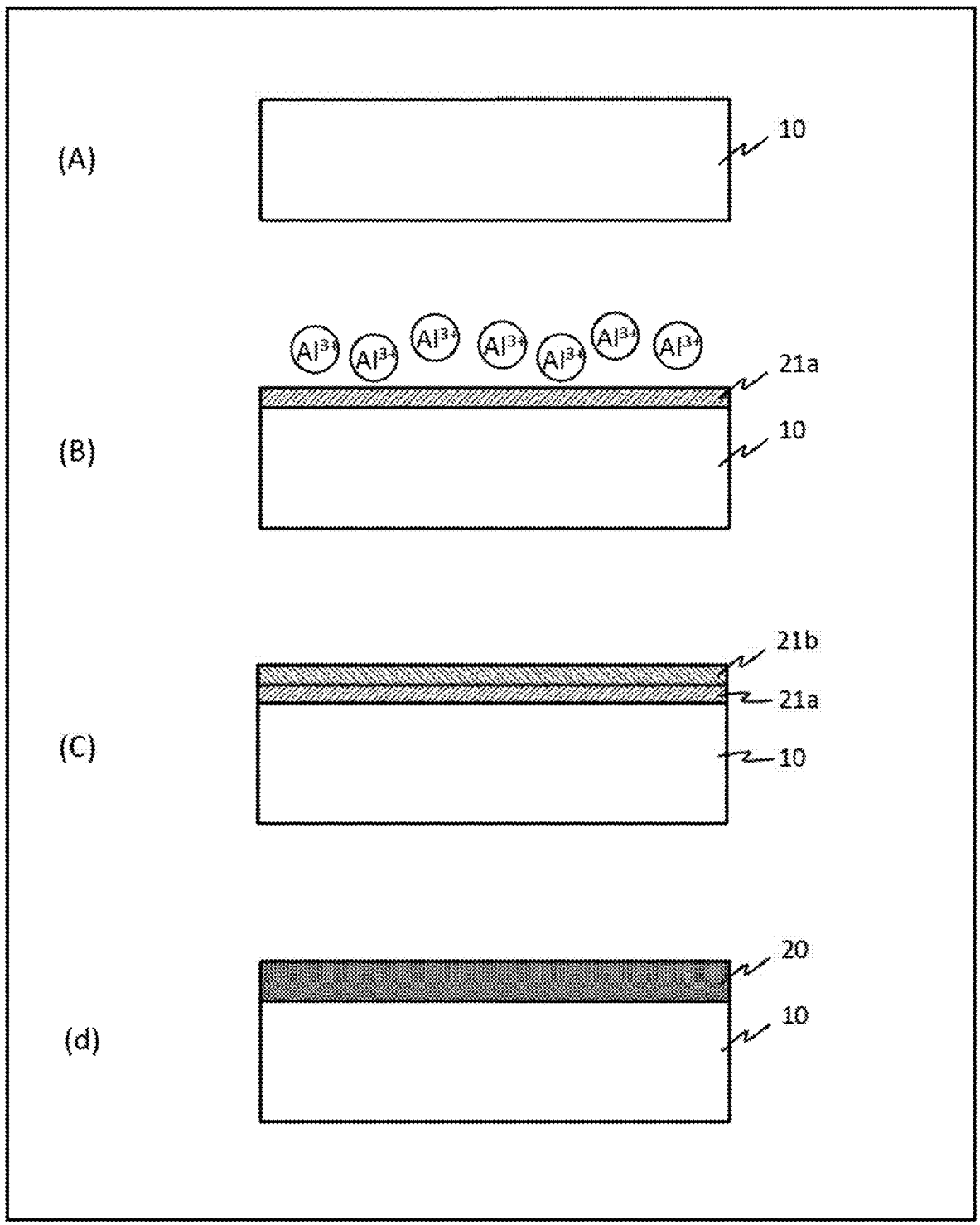

【FIG.3】
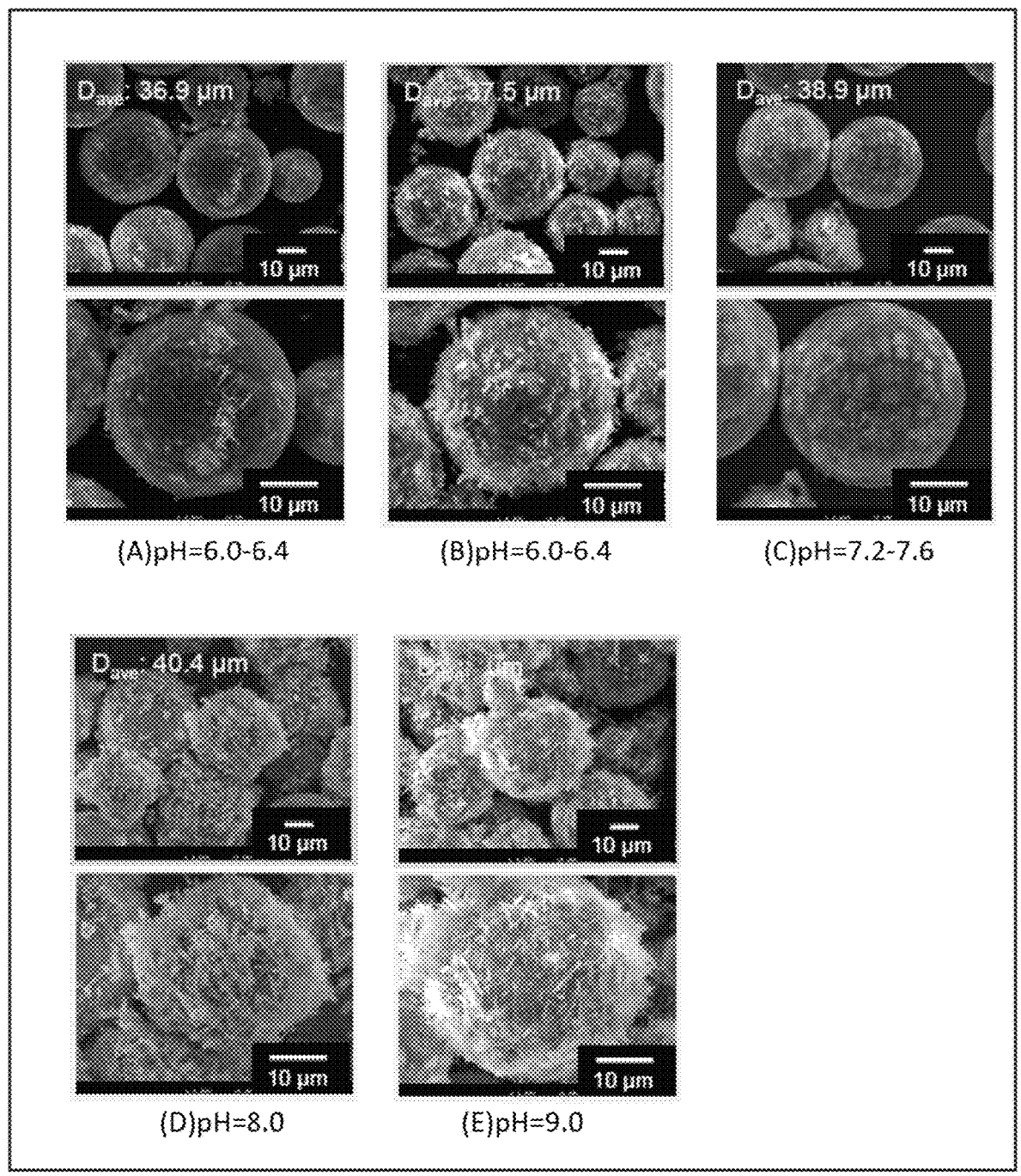

[FIG.4]
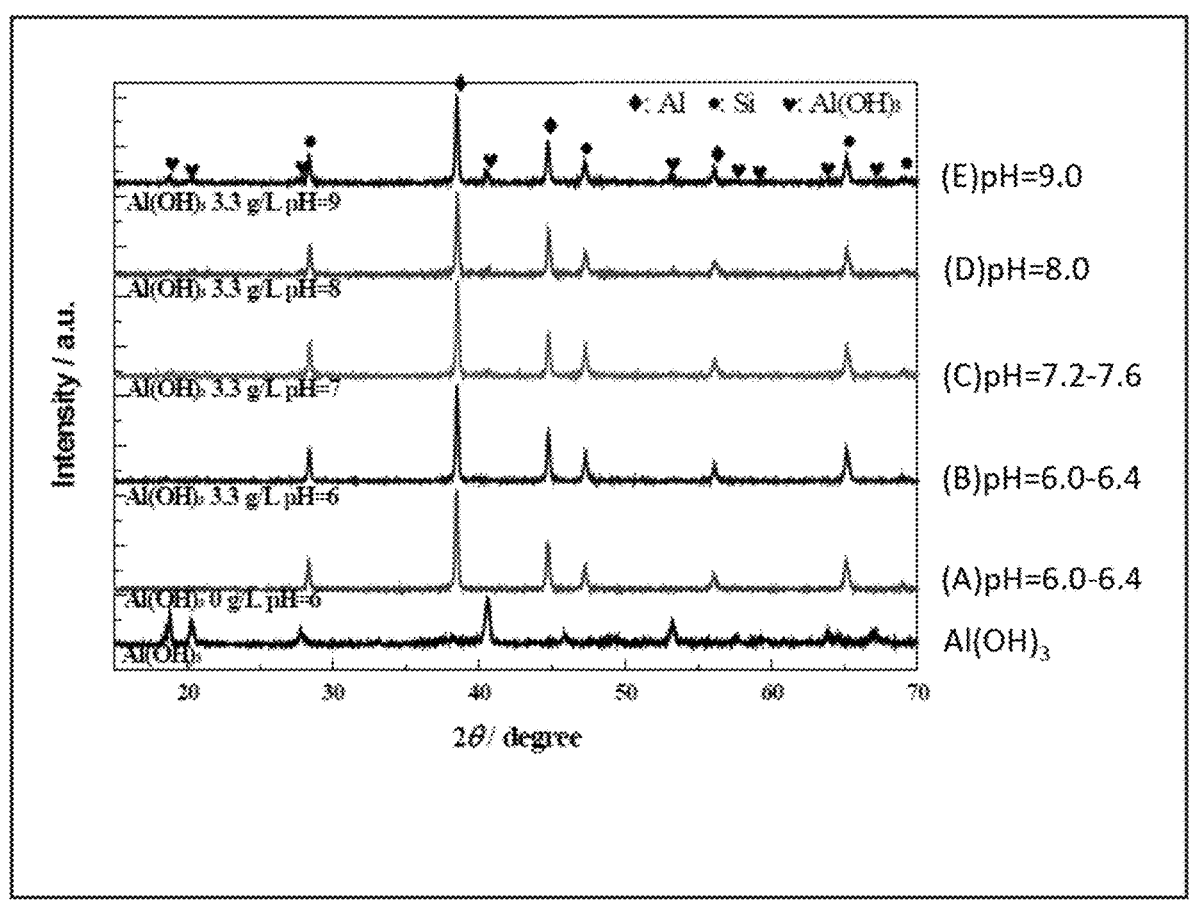

【FIG.5】
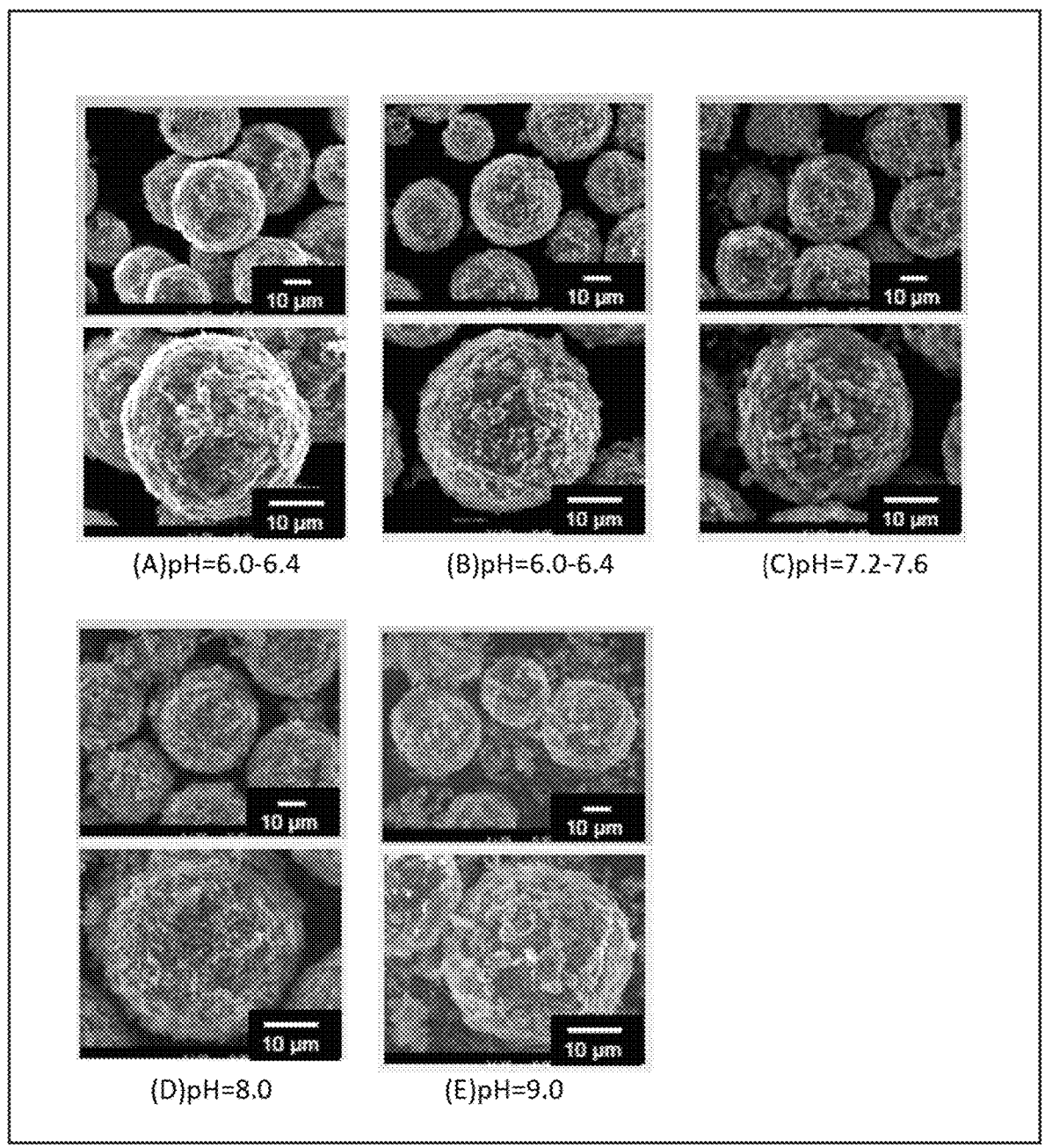

[FIG.6]
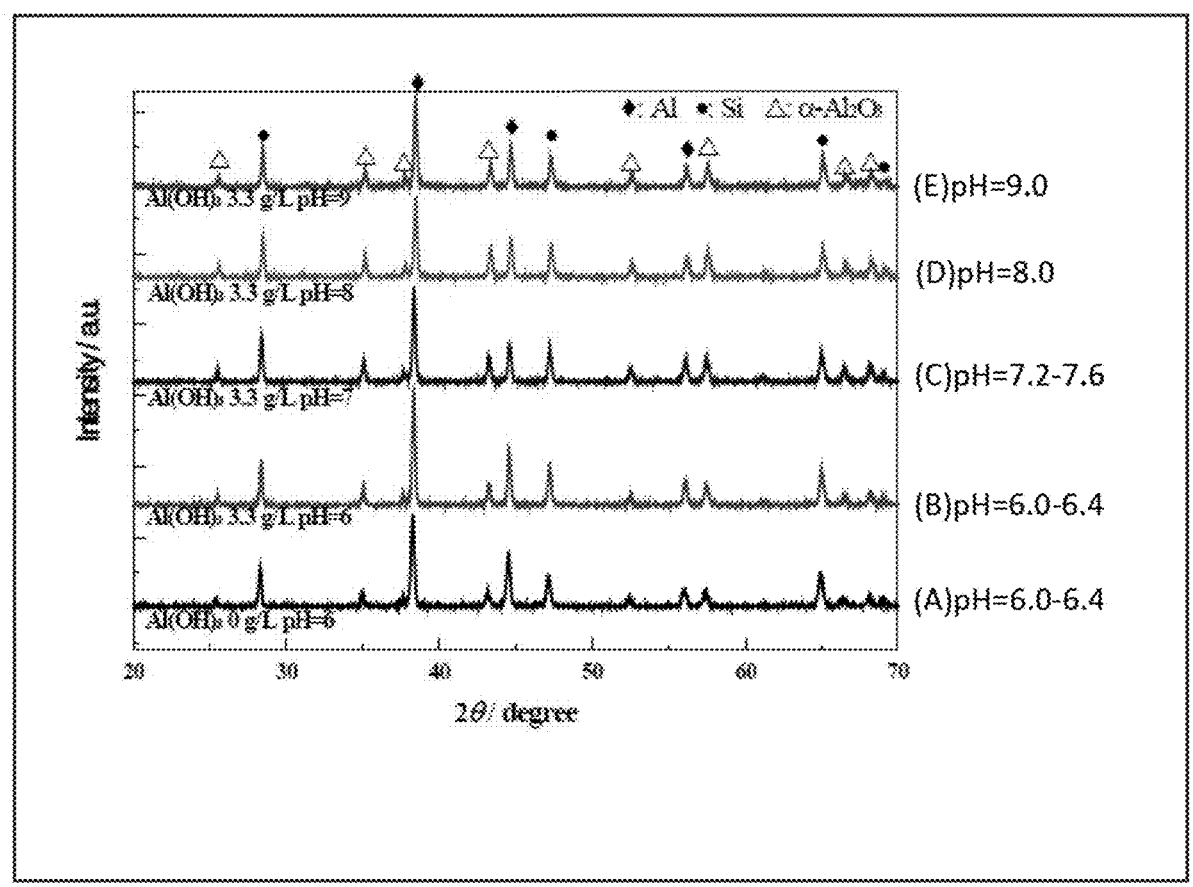

【FIG.7】
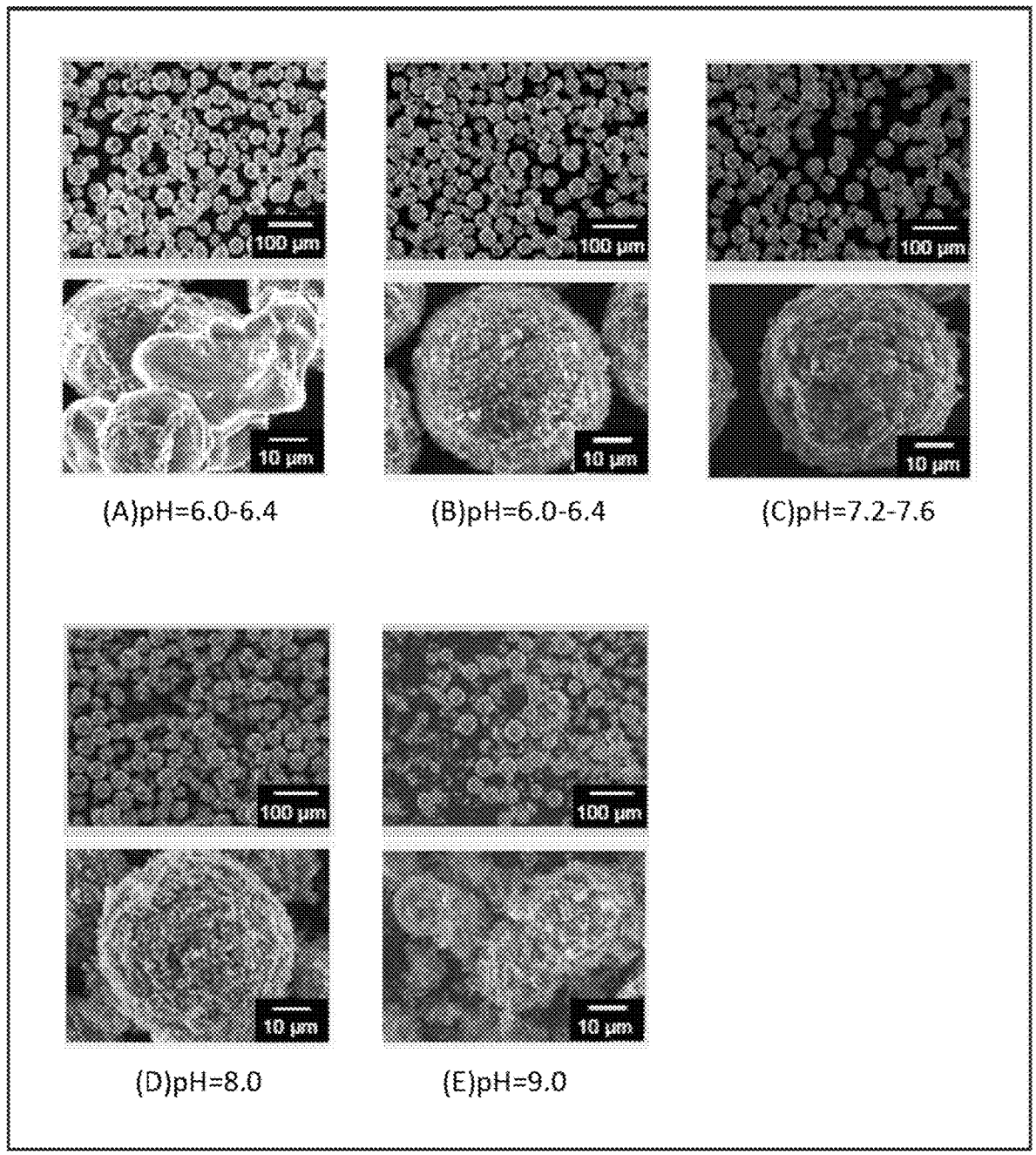

[FIG.8]
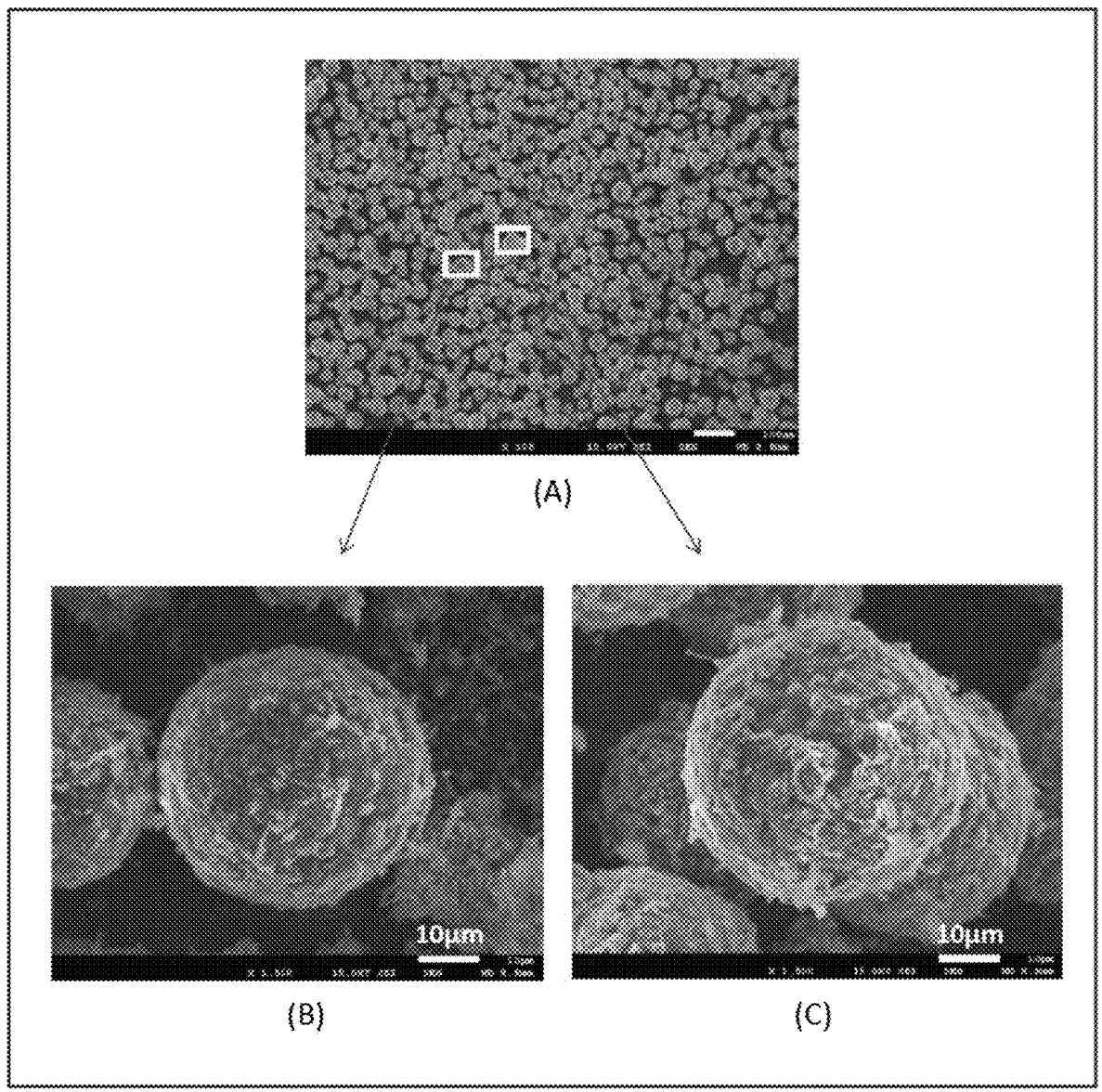

【FIG.9】
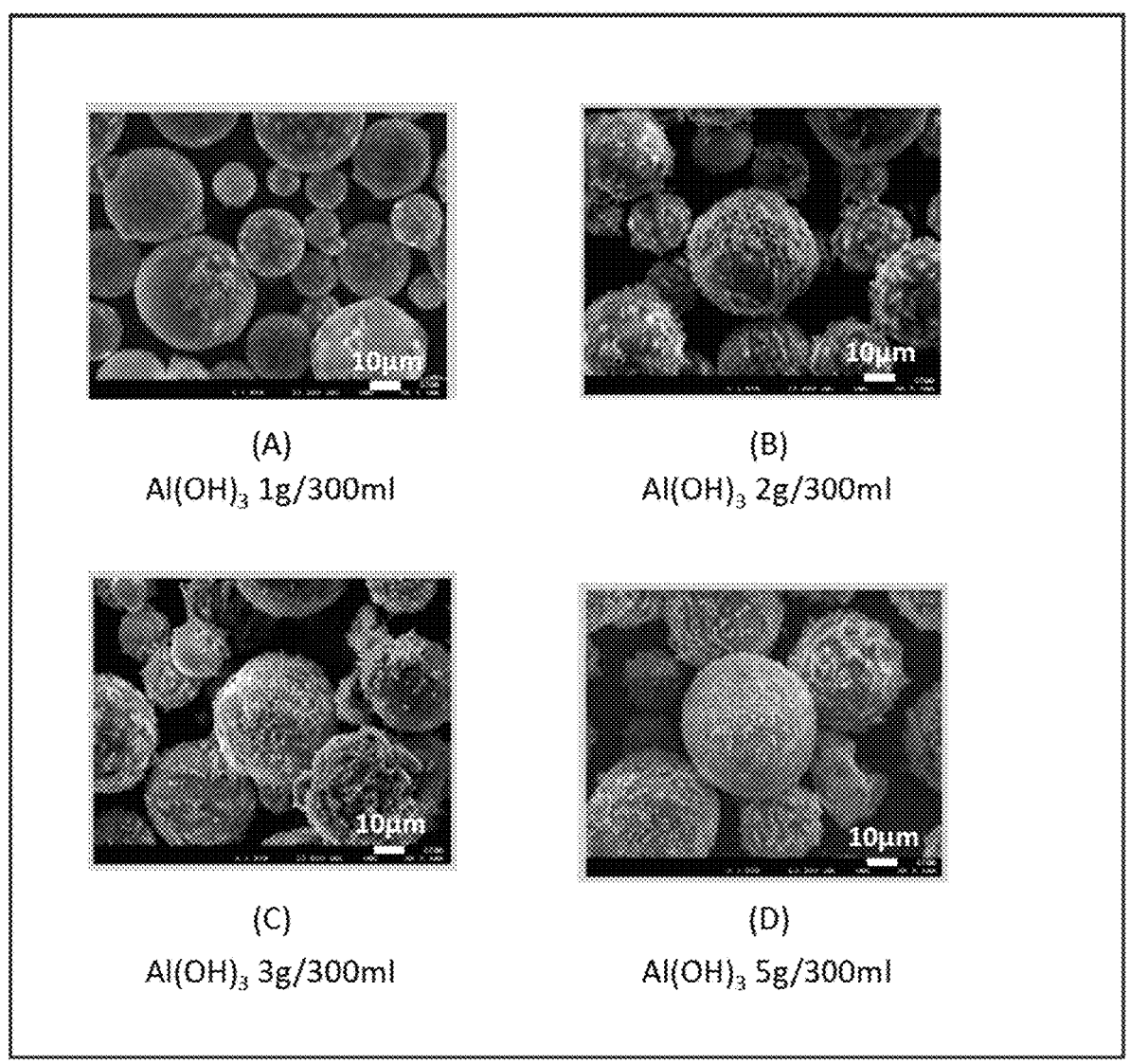

[FIG.10]
(A)
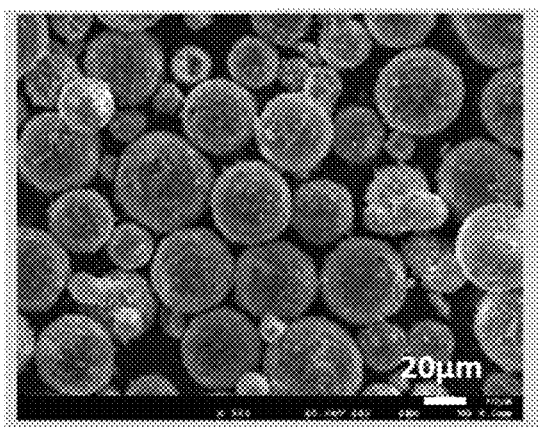
(B)
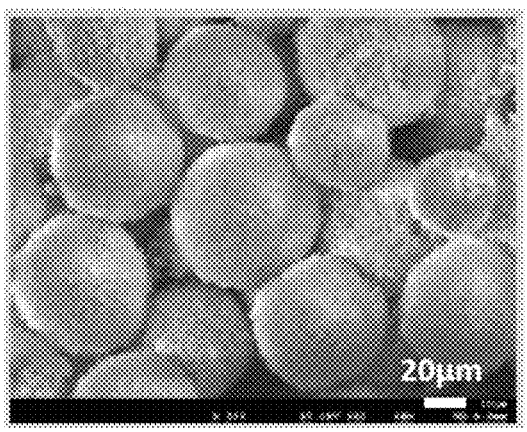
(C)
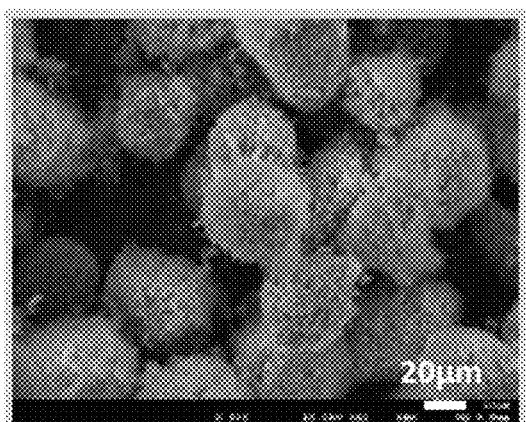

【FIG.11】
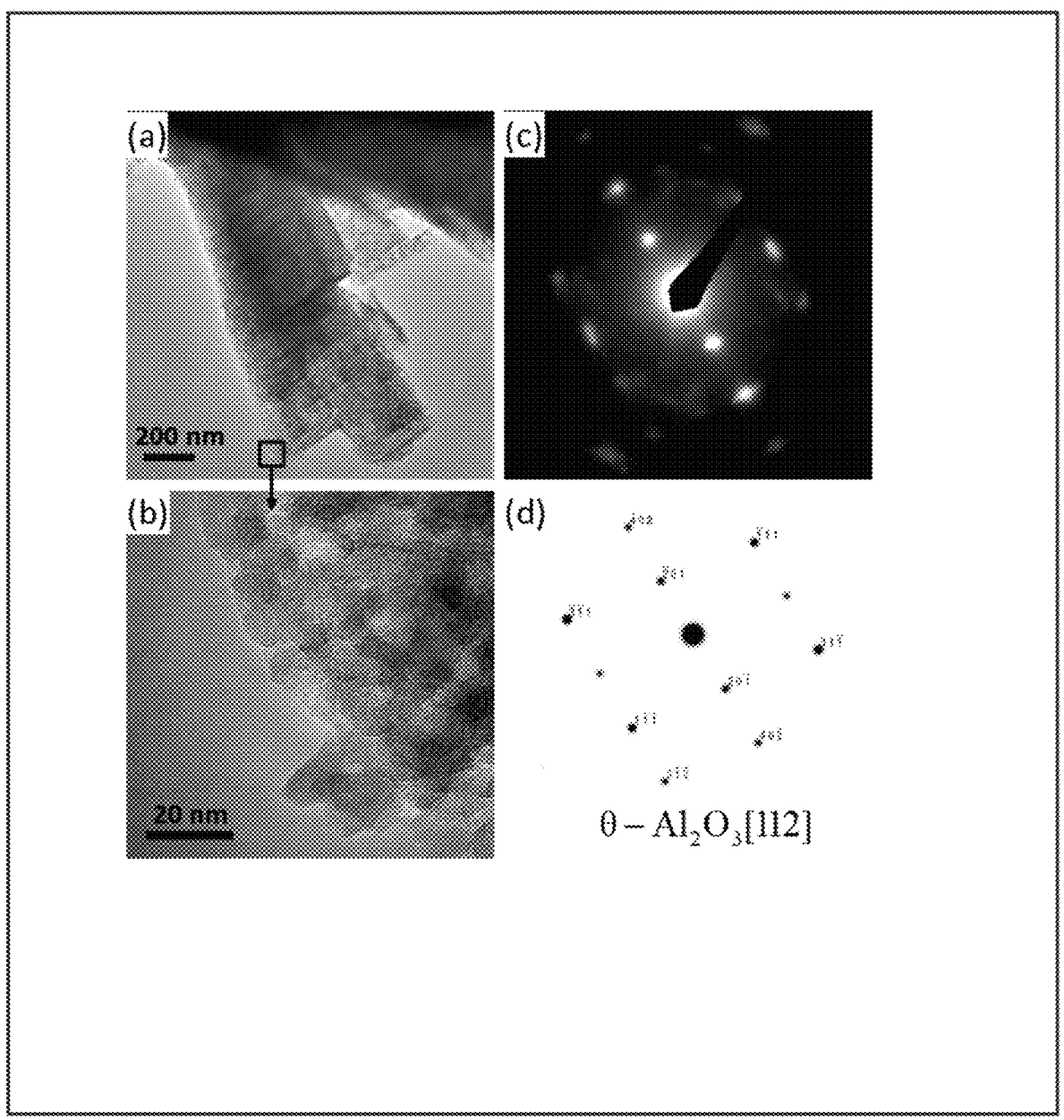

[FIG.12]
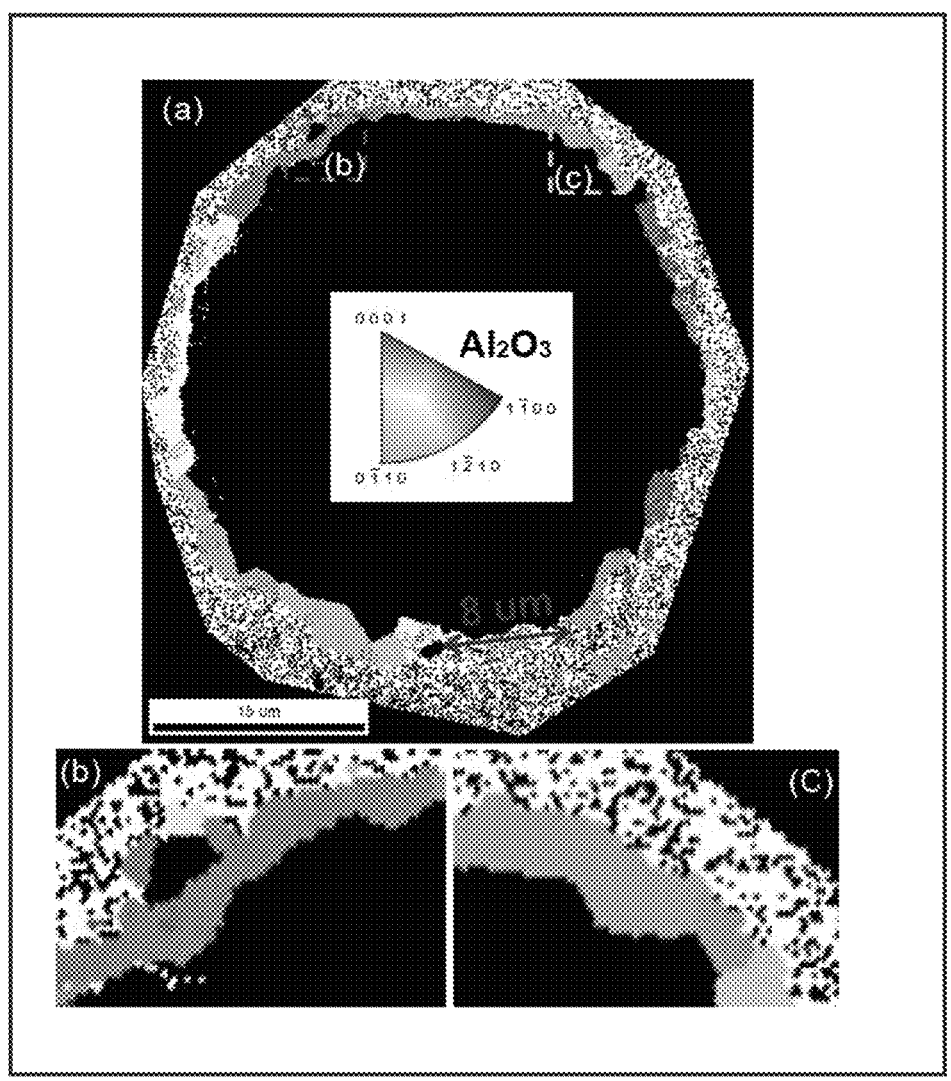

[FIG.13]
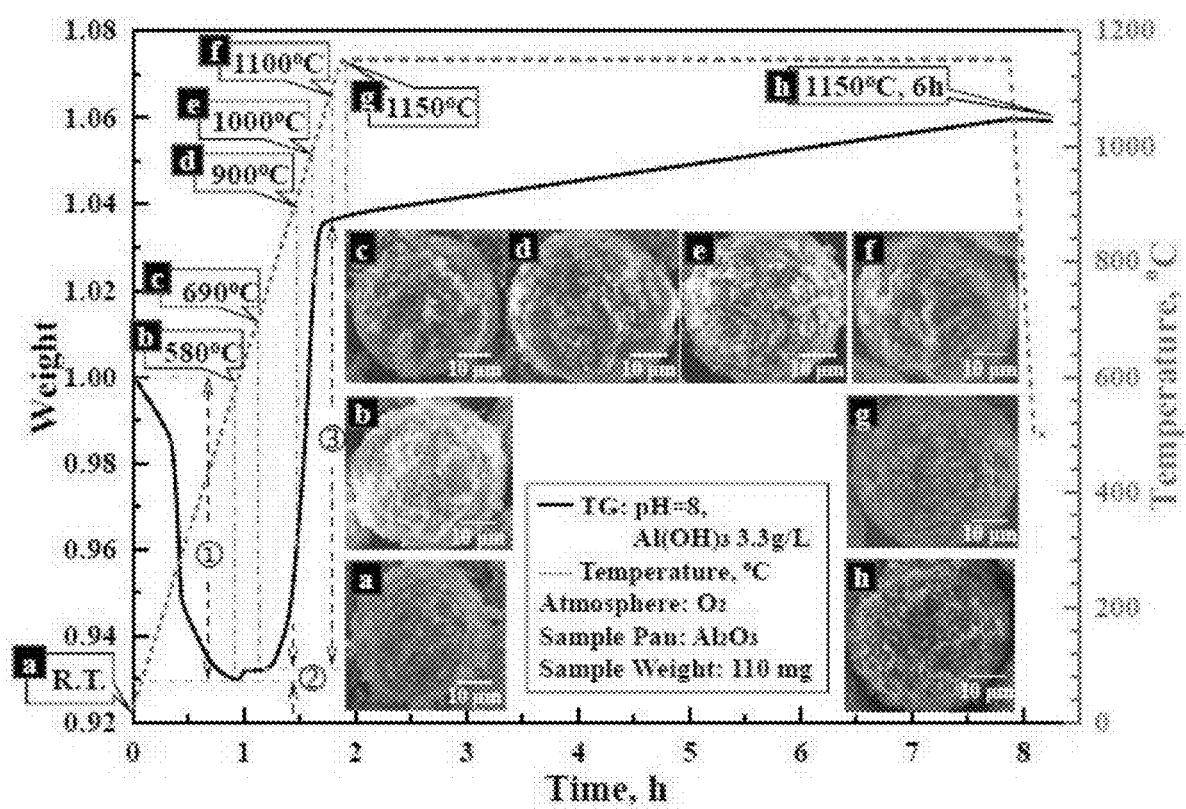

[FIG.14]
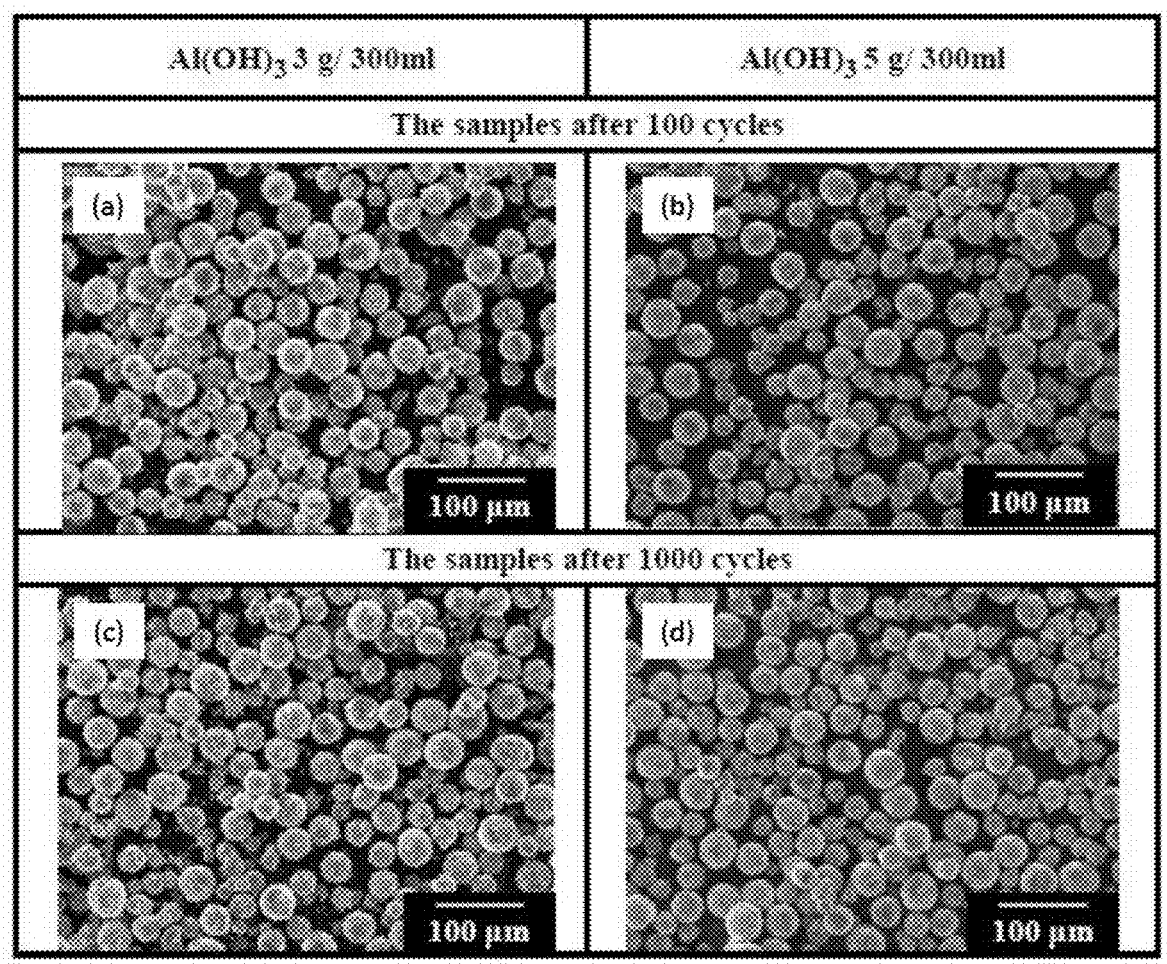

[FIG.15]
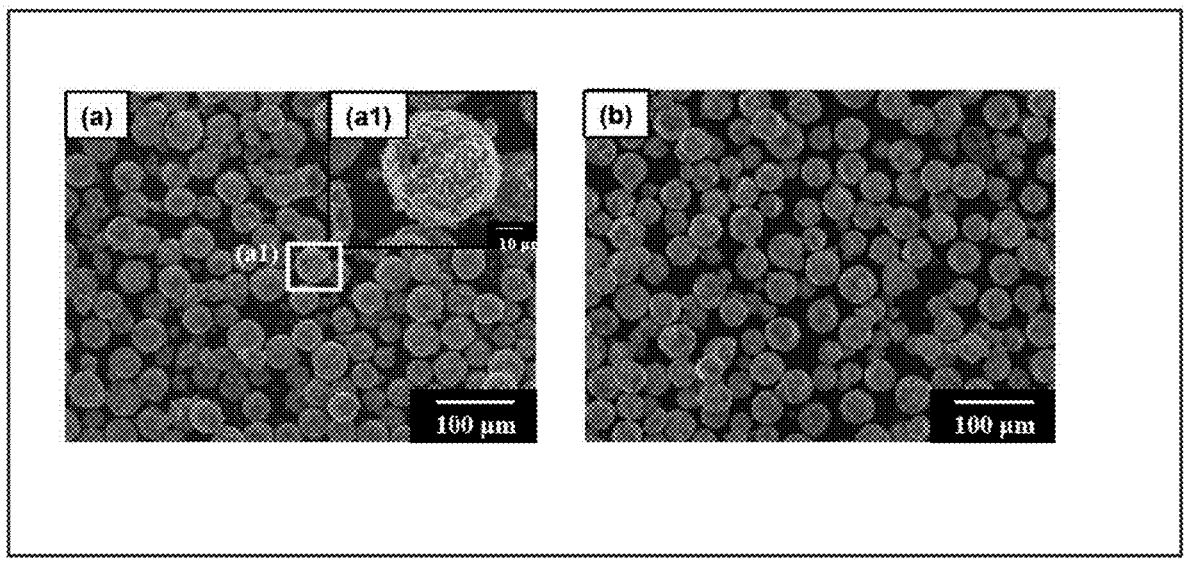

[FIG.16]
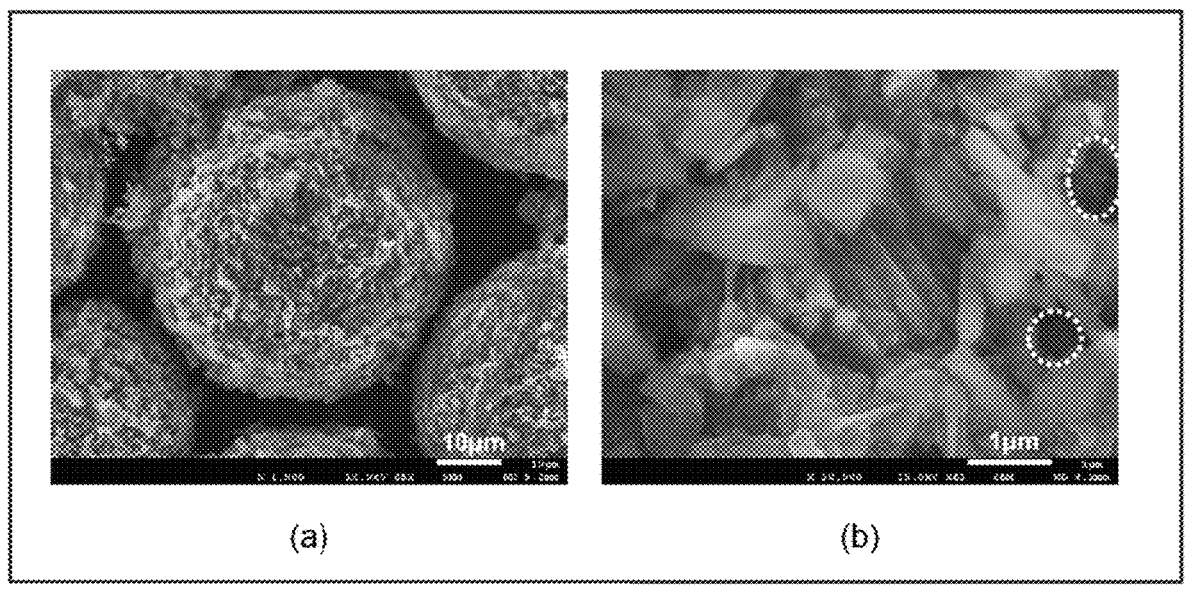
(a) (b)

LATENT-HEAT STORAGE BODY MICROCAPSULES AND PROCESS FOR PRODUCING LATENT-HEAT STORAGE BODY MICROCAPSULES

TECHNICAL FIELD

The present invention relates to a heat storage technology, and more particularly, a micro-sized latent-heat storage body excellent in heat storage density and heat conductivity, usable at a relatively high temperature, and a process for producing the same.

BACKGROUND ART

As a method of storing heat, sensible heat storage utilizing temperature changes (e.g., Patent Literature 1: Japanese Patent Laid-Open No. 6-50681), and latent heat storage utilizing phase changes of a material (e.g., Patent Literature 2: Japanese Patent Laid-Open No. 10-238979) are known.

Among them, the sensible heat storage technology has a problem of low heat storage density, because only the sensible heat due to temperature changes of a material is utilized, although the technology enables heat storage at a high temperature. The latent heat storage technology which utilizes the latent heat of molten salts or the like to store the heat has been proposed as a method for solving the problem.

In the latent heat storage technology, the latent heat of a phase change material (PCM) in solid-liquid phase change is utilized. In comparison with the sensible heat storage technology, the latent heat storage technology, therefore, enables high-density heat storage, and in addition thereto, the waste heat derived from a reaction heat can be collected, transported, and supplied at a constant temperature, which is attracting attention in technical fields such as solar heat utilization and waste heat utilization.

However, a PCM is transformed into a molten state, when heat is stored. Encapsulation to prevent leakage of the PCM in a molten state is therefore required, and various encapsulation methods have been proposed until now. For example, Patent Literature 3 (Japanese Patent Laid-Open No. 11-23172) discloses an invention relating to a latent heat storage capsule comprising a latent heat storage material with a surface coated with a one-layer, two-layer or three-layer metal coating film, a process for producing a latent heat storage capsule comprising applying a metal coating film to a latent heat storage material by electroplating, and the like.

Although the latent heat storage material capsule disclosed in Patent Literature 3 can be micronized, the heat resistance is low because the coating film of metal is formed by electroplating. As a result, the metal coating film tears when used at a high temperature, causing a problem that the PCM in a molten state leaks out.

From the perspectives of the heat transfer performance and the operability in heat transport use, it is advantageous to encapsulate a PCM into a micro size. Accordingly, in Patent Literature 4 (Japanese Patent Laid-Open No. 2012-140600), a technique of microencapsulation of a PCM having a melting point of 150° C. or less is proposed, and an invention relating to a heat storage body microcapsule comprising a core including at least one water-soluble latent heat storage material selected from salt hydrates and sugar alcohols, and a polymer obtained from a water-soluble monomer mixture of a water-soluble monofunctional monomer and a water-soluble multifunctional monomer, the core being coated with a shell formed of hydrophobic resin, is disclosed.

In the heat storage body microcapsule disclosed in Patent Literature 4, however, the latent heat storage material is limited to a water-soluble material, having a problem that use under a high temperature, harsh environment in which corrosion easily occurs, is extremely difficult.

In Patent Literature 5 (Japanese Patent Laid-Open No. 2012-111825), a technique for encapsulation of a PCM for high temperature use which is usable at 150° C. or more is proposed, and an invention relating to a heat storage body comprising an internal heat storage body composed of a material having heat storage capability and an outer shell composed of a ceramic with a relative density of 75% or more which encloses the internal heat storage body is disclosed. In the invention, nitrates, chlorides, carbonates, fluoride salts, and metals having a melting point of 150° C. or more are proposed as the PCM, and from the perspective of corrosion resistance to the PCM at a high temperature, ceramics such as $Al_2O_3$, AlN, SiC and $Si_3N_4$ are used as a capsule material.

However, although the heat storage body capsule disclosed in Patent Literature 5 has favorable properties from the perspectives of heat resistance and corrosion resistance, the capsule is produced by separately making the outer shell of the heat storage body and the internal storage body corresponding to the internal shape of the outer shell, then disposing the internal heat storage body in the two-part outer shell, and bonding the joint faces of the outer shell, so that the molding and processing are extremely difficult. In addition thereto, the size of the capsule is required to be large in due course, so that microencapsulation is practically impossible.

Considering these problems, the present inventors have proposed a PCM microcapsule in an aspect where the core surface of an Al-base alloy PCM particle is coated with a ceramic coating film (shell), prepared by using the Al-base alloy PCM particle as a core particle to which chemical conversion coating treatment and oxide film treatment are applied (Patent Literature 6: description in International Application No. PCT/JP2015/00204).

In the production step of the PCM microcapsule, an alloy particle with an alloy composition comprising Al is subjected to chemical conversion coating treatment (e.g., boehmite treatment) at a relatively low temperature (80 to 374° C.), so that an $Al_2O_3.H_2O$ coating film is formed on the surface of the alloy particle. The $Al_2O_3.H_2O$ coating film is heat treated at 500° C. or more to make a dense $Al_2O_3$ coating film through desorption of the hydrated water.

Subsequently, in the air or a high concentration oxygen atmosphere, the temperature of the sample after chemical conversion coating treatment is raised to the melting point of the PCM or more to melt the PCM. As a result, the PCM causes volume expansion due to solid-liquid phase change, so that cracks occur in the $Al_2O_3$ coating film. As a result, the molten PCM inside the coating film is exposed to the oxidation atmosphere. On this occasion, the Al component in the molten PCM reacts with oxygen and the cracks are repaired with the oxide film, so that encapsulation is achieved, with the $Al_2O_3$ coating film functioning as the shell.

The PCM microcapsule thus obtained is excellent in heat resistance, abrasion resistance and corrosion resistance because it has a ceramic coating film. Since a part of the composition of the PCM is used as the base material of the capsule, the capsule can be easily produced by only applying the treatment to a micro-size alloy particle. Furthermore, the film thickness of a capsule can be freely controlled by adjusting the type of solvent, the treatment temperature and the treatment time in the chemical conversion coating treatment, and conditions for the oxide film treatment (atmospheric gas, temperature, time, etc.); and the heat resistance, the abrasion resistance and the corrosion resistance of a coating film can also be freely controlled by change of the atmospheric gas.

Since the melting point of an Al-base alloy is in the range of about 300 to 1200° C. due to its composition, PCM microcapsules that can correspond to various heat sources can be produced by appropriately selecting the alloy composition, so that the problems of the conventional techniques described above can be solved.

CITATION LIST

Patent Literature

[Patent Literature 1] Japanese Patent Laid-Open No. 6-50681
[Patent Literature 2] Japanese Patent Laid-Open No. 10-238979
[Patent Literature 3] Japanese Patent Laid-Open No. 11-23172
[Patent Literature 4] Japanese Patent Laid-Open No. 2012-140600
[Patent Literature 5] Japanese Patent Laid-Open No. 2012-111825
[Patent Literature 6] Description in International Application No. PCT/JP2015/002204

SUMMARY OF INVENTION

Technical Problem

In the production method of PCM microcapsules disclosed in Patent Literature 6, however, thickening of the shell required to ensure the cyclic strength of a capsule is difficult, being limited to a film thickness of about 1 to 2 μm. Further, Al in the PCM is consumed as a constituent element of the shell, so that the Al composition in the PCM after encapsulation changes (decreases), causing problems such as reduction in the amount of latent heat and difficulty in the adjustment of the operating temperature due to difficult control of the melting point.

In the light of the problems that the PCM microcapsule disclosed in Patent Literature 6 has, the present invention has been made to provide a latent heat storage body microcapsule excellent in the heat storage density and the heat conductivity, stable in the heat storage cycles and usable at a relatively high temperature, by securing the cyclic strength of a capsule by making an increase in the shell thickness possible and causing no composition change of the PCM in the production process.

Solution to Problem

In order to solve the problem, a first aspect of a process for producing a latent heat storage material microcapsule according to the present invention comprises a first step of forming a primary coating film by chemical conversion coating treatment of the surface of a core particle, a second step of forming a secondary coating film by treating the core particle after the first step in a solution comprising Al ions such that hydroxide of aluminum is deposited on the surface of the primary coating film by cooling the solution to a supersaturation temperature of Al ions, and a third step of forming an Al oxide film on the surface of the core particle by heat treating the secondary coating film in an oxidizing atmosphere.

A second aspect of a process for producing a latent heat storage body microcapsule according to the present invention comprises a first step of forming a primary coating film by chemical conversion coating treatment of the surface of the core particle in a solution comprising Al ions, a second step of forming a secondary coating film by cooling the solution to a supersaturation temperature of Al ions such that hydroxide of aluminum is deposited on the surface of the primary coating film, and a third step of forming an Al oxide film on the surface of the core particle by heat treating the secondary coating film in an oxidizing atmosphere.

In a preferred aspect, the solution comprising Al ions is a solution comprising Al(OH)$_3$, and the hydroxide of aluminum comprises Al(OH)$_3$.

For example, in the heat treatment in the third step, at least a reaction according to the following formula involves to make the secondary coating film into an Al$_2$O$_3$ film.

$$Al(OH)_3 \rightarrow 0.5Al_2O_3 + 1.5H_2O\uparrow$$

Preferably, the heat treatment in the third step is performed at a temperature equal to or higher than the melting point of the core particle.

Also preferably, the heat treatment in the third step is performed at a temperature where the Al$_2$O$_3$ film is made into an α-Al$_2$O$_3$ film.

Also preferably, the pH of the solution comprising Al ions is set within a range of 6.0 or more and less than 9.0.

Also preferably, a nucleation accelerator such as sodium dodecyl sulfate (NaDS) is contained in the solution comprising Al ions.

For example, the core particle is an Al alloy such as an Al—Si alloy.

For example, the chemical conversion coating treatment is any one of a sol-gel process, an anodizing treatment, an alkali-chromium hydrochloride process, a boehmite process, a chromium hydrochloride process, a phosphoric acid-chromic hydrochloride process, a zinc phosphate process, and a non-chromate chemical conversion coating treatment.

In an aspect, the process further comprises a step of forming a metal coating film or a ceramic coating film for enhancing the mechanical strength by chemical or physical treatment of the surface of the Al oxide film.

In an aspect, the process further comprises a step of supporting or depositing a catalyst material on the surface of the Al oxide film.

In an aspect, the process further comprises a step of supporting or depositing a catalyst material on the surface of the metal coating film or the ceramic coating film.

A process for producing a heat exchange material of the present invention comprises a step of supporting the latent heat storage body microcapsule obtained by the process described above dispersed in a heat-resistant matrix.

A latent heat storage body microcapsule of the present invention comprises a core particle of latent heat storage material with a surface coated with an oxide film, wherein the oxide film comprises three layers of a first oxide film directly covering the surface of the core particle, a second oxide film covering the first oxide film, and a third oxide film covering the second oxide film, wherein the first oxide film is a dense oxide film of an oxide of the compositional element of the core particle, the second oxide film is a porous oxide film of an oxide of the compositional element of the core particle, and the third oxide film is a porous oxide film of an oxide of the compositional element of the core particle, having a structure different from the second oxide film.

Preferably, the core particle is made of Al alloy.

Preferably, the Al alloy is an Al—Si alloy.

For example, the first oxide film is a dense film of $\alpha$-$Al_2O_3$.

Also, for example, the second oxide film is a porous film mainly made of $\alpha$-$Al_2O_3$.

Further, for example, the third oxide film is a porous film in which $\alpha$-$Al_2O_3$ and $\theta$-$Al_2O_3$ are present mixedly.

Advantageous Effect of Invention

In the present invention, after a primary coating film is formed by boehmite treatment of the surface of a core particle in a solution comprising Al ions, a secondary coating film is formed by cooling the solution to the supersaturation temperature of the Al ions to cause deposition of a hydroxide of aluminum on the surface of the primary coating film, and an Al oxide film is formed on the surface of the core particle by heat treating the secondary coating film in an oxidizing atmosphere.

Consequently, the shell is thickened by the amount of secondary coating film formed, so that the cyclic strength of the capsule can be secured. Also, formation of the primary coating film and the secondary coating film proceeds using Al ions in the solution as the main source of Al, so that the composition change of the PCM in the production process is remarkably suppressed. As a result, a latent heat storage body microcapsule excellent in the heat storage density and the heat conductivity, stable in the heat storage cycles and usable at a relatively high temperature, is provided.

BRIEF DESCRIPTION OF DRAWINGS

FIG. 1 is a cross sectional view for conceptually illustrating the structure of a latent heat storage body microcapsule of the present invention.

FIG. 2 is a drawing for illustrating an example of the production process of the latent heat storage body microcapsule of the present invention.

FIG. 3 is SEM images of the particles after formation of a secondary coating film in an Example.

FIG. 4 is an X-ray diffraction chart of each of the samples shown in FIGS. 3 (A) to (E).

FIG. 5 is SEM images of the surface state of core particles after heat treatment.

FIG. 6 is an X-ray diffraction chart of each of the samples shown in FIGS. 5 (A) to (E).

FIG. 7 is SEM images illustrating the appearance of the oxide film of each of the samples shown in FIGS. 5 (A) to (E) after implementation of 100 heating/cooling cycles (rate: 50 K/min) in the temperature range of 500 to 650° C.

FIG. 8 is SEM images illustrating the appearance of the oxide film of each of the samples shown in FIG. 7 (C) after implementation of 1000 heating/cooling cycles (rate: 50 K/min) in the temperature range of 500 to 650° C.

FIG. 9 is SEM images of the respective particles with a secondary coating film formed with a different $Al(OH)_3$ content in the solution for use in the boehmite treatment.

FIG. 10 is SEM images of the particles after formation of the secondary coating film with amounts of sodium dodecyl sulfate added to 300 ml of solution for use in the boehmite treatment of 0 mMol (no addition), 1.0 mMol or 1.8 mM, respectively.

FIG. 11 is a drawing showing the results of TEM observation of the surface layer (Al oxide film portion) of a latent heat storage body microcapsule produced by the process of the present invention.

FIG. 12 is a drawing showing the analysis results of the crystalline orientation of $Al_2O_3$ in the cross section the latent heat storage body microcapsule by the EBSD method.

FIG. 13 is a chart showing the thermogravimetric analysis (TG) results for understanding the thermal reaction process including thermal decomposition when the particles after formation of the secondary coating film are subjected to the heat treatment in an oxidizing atmosphere (oxidation heat treatment).

FIG. 14 is SEM images showing the general views of the particles after the latent heat storage body microcapsules produced by the process of the present invention are subjected to 100 to 1000 repeating cycles in the temperature range of melting (650° C.) to solidification (500° C.) at a heating/cooling rate of 50 K/min.

FIG. 15 is SEM images showing the general view of the particles after implementation of up to 3000 melting-solidification cycles.

FIG. 16 is the SEM observation results of the surface of samples obtained through boehmite treatment in 300 mL of an aqueous solution with addition of 1 g of $Al(OH)_3$ (pH=8) and thermal oxidation at 1150° C. for 6 hours.

DESCRIPTION OF EMBODIMENT

With reference to drawings, the latent heat storage body of the present invention and the production process thereof are described as follows.

In the following description, an aspect where the treatment in a solution comprising Al ions is performed in a step of forming a primary coating film (step of chemical conversion coating treatment) is described. The treatment, however, is not limited to the aspect, and the surface of a core particle may be subjected to chemical conversion coating treatment to form a primary coating film in advance and the core particle with the primary coating film may be treated in a solution comprising Al ions. In this case, the solution comprising Al ions for the treatment of the core particle having the primary coating film formed thereon is cooled to the supersaturation temperature of the Al ions to form a secondary coating film by deposition of hydroxide of aluminum on the surface of the primary coating film. The secondary coating film is heat treated in an oxidizing atmosphere, so that an Al oxide film is formed on the surface of the core particle.

In the following description, the chemical conversion coating treatment is a boehmite treatment. The chemical conversion coating treatment, however, is not limited thereto, and may be performed by the method such as a sol-gel process, an anodizing treatment, an alkali-chromium hydrochloride process, a chromium hydrochloride process, a phosphoric acid-chromic hydrochloride process, a zinc phosphate process, and a non-chromate chemical conversion coating treatment.

[Basic Structure of Latent Heat Storage Body Microcapsule]

FIG. 1 is a cross sectional view for conceptually illustrating a structure of a latent heat storage body 100 of the present invention. In the drawing, an object with a reference numeral 10 is a core particle having a radius R made of a latent heat storage body. The core particle 10 is made of, for example, an Al-base alloy (e.g., Al—Si alloy), with a surface coated with a coating film 20 of Al oxide. $\alpha$-$Al_2O_3$ is chemically stable, suitable as the oxide film 20. The process of the present invention is effective even in the case of a core particle of alloy (metal) with a composition comprising no Al, because $Al^{3+}$ ions serving to form the coating film 20 of Al oxide are supplied from the outside. In the following description, however, the core particle is presumed to be an Al alloy (Al—Si alloy).

When the core particle 10 absorbs heat from the surrounding, the absorbed heat is stored as latent heat through phase transformation from a solid phase to a liquid phase. On the contrary, when the latent heat is emitted to the surrounding, phase transformation from liquid phase to solid phase occurs. In general, a volume $V_S$ in solid phase and a volume $V_L$ in liquid phase has a relation: $V_S \leq V_L$. In the case of an oxide film formed in a solid phase state only, an oxide film 20 covering the surface of the core particle 10 is damaged due to expansion of the core particle 10 in phase transformation from solid phase to liquid phase, so that the molten components of the latent heat storage material leak out.

In the present invention, as described below, a precursor of a capsule (oxide film) is therefore formed by chemical conversion coating treatment (boehmite treatment) of the surface of the core particle at the melting point of the latent heat storage material or below in a first step and a second step. Consequently, even when an oxide film is formed in a third step at a temperature equal to or higher than the melting point of the core particle, the spherical capsule shape can be maintained, so that no components of the latent heat storage material leak out.

As described above, the chemical conversion coating treatment of the surface of the core particle may be performed in advance to form a primary coating film, and the core particle with the primary coating film may be treated in a solution comprising Al ions. In this case, the solution comprising Al ions for the treatment of the core particle having the primary coating film formed thereon is cooled to the supersaturation temperature of the Al ions to form a secondary coating film by deposition of hydroxide of aluminum on the surface of the primary coating film. The secondary coating film is heat treated in an oxidizing atmosphere, so that an Al oxide film is formed on the surface of the core particle.

The chemical conversion coating treatment may be performed by a method other than boehmite treatment such as a sol-gel process, an anodizing treatment, an alkali-chromium hydrochloride process, a chromium hydrochloride process, a phosphoric acid-chromic hydrochloride process, a zinc phosphate process, and a non-chromate chemical conversion coating treatment.

Furthermore, through encapsulation (oxide film treatment) of a latent heat storage material in a liquid state having an expanded volume as a third step, a space buffer for absorbing the expanded volume fraction in the phase transformation from solid phase to liquid phase can be also obtained. The molten components of the latent heat storage material, therefore, remain in an internal space coated with the oxide film 20, so that the oxide film 20 is not damaged. Since the precursor obtained by the chemical conversion coating treatment forms an extremely dense oxide precursor phase, the oxide phase to be obtained by heat treatment/oxidation treatment is extremely dense, which is extremely advantageous as a capsule for enclosing a latent heat storage material.

As the difference between the volume $V_S$ of a latent heat storage material in solid phase and the volume $V_L$ in liquid phase increases, a cavity part in the space coated with the oxide film 20 to occur when the latent heat storage material is in solid phase increases. The presence of the cavity part allows strain occurring between a part in contact with the core particle and a part not in contact with the core particle to increase in the internal surface of the oxide film 20, so that the oxide film 20 may be damaged in repetitive use.

It is therefore preferable that a material with a controlled low volume expansion coefficient in phase transformation from solid phase to liquid phase is selected as the latent heat storage material.

An alloy of a metal having a positive volume expansion coefficient at melting and a metal having a negative volume expansion coefficient at melting can be exemplified as the latent heat storage material. Examples of the metal having a positive volume expansion coefficient include Al. Examples of the metal having a negative volume expansion coefficient include Si and Bi. In the case where an Al—Si alloy is selected and represented by Al-x·wt % Si, it is preferable that x is in the range of 0 to 25 (in the case of x=0, metal Al). In particular, in the case where the Si content proportion in an Al—Si alloy is 25 wt %, the volume expansion coefficient of the Al—Si alloy at melting can be controlled at 0%.

In the following description, the core particle is presumed to be an Al alloy (more specifically, Al—Si alloy). As described above, since $Al^{3+}$ ions are supplied from the outside in the process of the present invention, the process is effective even in the case of a core particle of alloy (metal) with a composition containing no Al.

[Production Process of Latent Heat Storage Body Microcapsule]

In the present invention, the process includes: forming a primary coating film by boehmite treatment of the surface of the core particle of an Al—Si alloy in a solution comprising Al ions (first step); subsequently forming a secondary coating film by cooling the solution to the supersaturation temperature of Al ions to cause deposition of hydroxide of aluminum on the surface of the primary coating film (second step); and further forming an Al oxide film on the surface of the core particle by heat treatment of the secondary coating film in an oxidizing atmosphere (third step).

FIG. 2 is a drawing for illustrating an example of the production process of the latent heat storage body microcapsule of the present invention. First, a core particle 10 of X wt % Al—Y wt % Si alloy (Al—Si alloy) is prepared (A). The core particle 10 is subjected to a chemical conversion coating treatment (boehmite treatment) in a solution comprising Al ions ($Al^{3+}$), for example, at a temperature of about 100° C., so that a primary coating film 21*a* having an $Al_2O_3 \cdot H_2O$ composition is formed on the surface of the core particle 10 through a reaction between Al ions and OH in the solution (B). The solution comprising Al ions is, for example, a solution comprising $Al(OH)_3$.

The boehmite process is a method for forming a coating film on the surface of aluminum in a high-temperature distilled water or weak alkaline aqueous solution. It is known that an $Al_2O_3 \cdot H_2O$ coating film can be mostly uniformly formed on the surface of an alloy comprising aluminum by the method as an optimum process to obtain a dense oxide film. It is also known that the treatment is generally performed at a temperature lower than the melting point of the constituent element of the corresponding latent heat storage body. Based on these reasons, a primary coating film 21*a* is formed by boehmite treatment in the present invention.

Without Al ions in the solution, the composition in the vicinity region of the surface of the core particle 10 is slightly deficient in Al in comparison with the initial composition (X wt % Al—Y wt % Si) by an amount of Al oxidized through the boehmite treatment, resulting in problems such as reduction in the amount of latent heat and difficulty in the adjustment of the operational temperature due to difficulty in melting point control. In the present invention, the primary coating film is therefore formed by boehmite treatment in a solution containing Al ions.

Successively to the first step, the solution is cooled to the supersaturation temperature of Al ions (for example, about 75° C.), such that the fraction of $Al^{3+}$ ions supersaturated in the solution is deposited as hydroxide of aluminum on the surface of the primary coating film 21a to form a secondary coating film 21b (C). In this example, due to the boehmite treatment in a solution comprising $Al(OH)_3$, hydroxide of aluminum deposited as the secondary coating film 21b is mainly composed of $Al(OH)_3$. The secondary coating film 21b is mainly composed of $Al_2O_3.H_2O$ and $Al(OH)_3$, not composed of $Al(OH)_3$ only. In other words, the main composition of hydroxide of aluminum to make the secondary coating film 21b comprises $Al_2O_3.H_2O$ and $Al(OH)_3$.

Following the second step, the secondary coating film 21b is heat treated in an oxidizing atmosphere, for example, at a temperature of about 1150° C., to form an Al oxide film 20 on the surface of the core particle 10 (D), so that a latent heat storage body microcapsule in an aspect shown in FIG. 1 is obtained. It is needless to say that not only the secondary coating film 21b but also the primary coating film 21a is made into an oxide film through the heat treatment.

Through the heat treatment in the third step, $Al(OH)_3$ contained in the secondary coating film 21b is made into a crystalline $Al_2O_3$ coating film according to the following reaction formula: $Al(OH)_3 \rightarrow 0.5Al_2O_3 + 1.5H_2O\uparrow$. Also, $Al_2O_3.H_2O$ contained in the secondary coating film 21b is made into crystalline $Al_2O_3$ through dissociation of moisture. Thereby the oxide film 20 which retains the molten components of a latent heat storage material inside, not only when the core particle 10 is in a solid phase state, but also when the core particle 10 is in a liquid phase state, is obtained.

In the present invention, since an Al—Si alloy is selected as the latent heat storage material, it is preferable that the heat treatment in the third step is performed at a temperature of 880° C. or more. It is also preferable that the upper limit of the heat treatment temperature is set at 1230° C. The melting point of the Al—Si alloy is in the vicinity of 600° C. depending on the composition ratio between Al and Si. For example, the melting point of an Al—Si alloy having a Si content rate of 25 wt % is 580° C. Accordingly, in the case where only the internal volume of a shell of the oxide film 20 formed by the heat treatment in the third step is set at the maximum volume the core particle 10 can have, it is sufficient that an aluminum oxide film as the secondary coating film 20 is formed on the surface of the core particle 10 by heat treatment, for example, at 700° C.

The aluminum oxide film formed by heat treatment has a crystalline form of $\gamma$-$Al_2O_3$ at a relatively low temperature of about 800° C. or less, and the secondary coating film 20 having a crystalline form of $\alpha$-$Al_2O_3$, which is presumed to be chemically stable, is obtained at a relatively high temperature of about 880° C. or more. Therefore, in the case where an Al—Si alloy is selected as the latent heat storage material, it is preferably that the heat treatment in the third step is performed at a temperature of 880° C. or more, to obtain the secondary coating film 20 of chemically stable $\alpha$-$Al_2O_3$.

In order to enhance the mechanical strength, the surface of the latent heat storage body microcapsule thus obtained (surface of Al oxide film) may be subjected to chemical or physical treatment to form a metal coating film or a ceramic coating film. For example, finishing coating of a metal coating film or an oxide coating film by a chemical process such as a sol-gel process, CVD, electroplating and electroless plating, and a physical treatment such as PVD enables the mechanical strength of a capsule to be enhanced.

Also, a catalyst material may be supported or deposited on the surface of an Al oxide film to provide a catalytic function. Thereby, a heat storage body having both of the catalytic function and a heat storage function (catalytic functional latent heat storage body microcapsule) can be obtained. Such a catalytic material may be supported or deposited on the surface of the metal coating film or the ceramic coating film described above.

The latent heat storage body microcapsule obtained by the method of the present invention may be dispersed in a heat-resistant matrix to be supported to make a heat exchange material. For example, it is conceivable that the latent heat storage body microcapsule of the present invention contained in a heat-resistant matrix or supported in a porous material is used as a heat storage material in a bulk form to replace existing heat storage bricks, ceramic balls for heat storage and porous ceramic filters in an aspect.

Examples

[Effect of pH of Boehmite Treatment Liquid]

As described above, the process for producing a latent heat storage body microcapsule of the present invention comprises, in the first step, forming a primary coating film by boehmite treatment of the surface of a core particle made of an Al-base alloy in a solution containing Al ions, subsequently, forming a secondary coating film by cooling the solution to a supersaturation temperature of Al ions such that hydroxide of aluminum is deposited on the surface of the primary coating film, and forming an Al oxide film on the surface of the core particle by heat treating the secondary coating film in an oxidizing atmosphere.

In the present example, the effect of the pH of the boehmite treatment liquid on formation of the Al oxide film was examined. As a result, it was confirmed that as the pH of the solution during the boehmite treatment increased, the quality of the Al oxide film obtained tended to be improved. In particular, it has been concluded that a pH set in the range of 6.0 or more and less than 9.0 is preferred, and a pH of 8 is more preferred.

First, core particles 10 of an Al—Si alloy (Al-25 wt % Si) with an Al weight proportion of 75% and a Si weight proportion of 25% were prepared. The core particles have a diameter of less than 38 μm, with an average diameter of 36.3 μm.

The core particle was subjected to a boehmite treatment in 300 mL of a solution in which 1 g of $Al(OH)_3$ was dissolved as an Al ion ($Al^{3+}$) source under conditions at 100° C. for 3 hours, so that a primary coating film having a composition of $Al_2O_3.H_2O$ was formed on the surface of the core particle. The precursor is made into $Al_2O_3$ by the subsequent heat treatment. The pH of the solution was adjusted in the range of 6.0 to 9.0 with addition of ammonia water ($NH_3.H_2O$).

Following the step of forming a primary coating film, the solution was cooled to 75° C., i.e., the temperature at which Al ions are supersaturated, and maintained at the temperature for 16 hours±5 hours. Through the treatment, a fraction of $Al^{3+}$ ions supersaturated in the solution is deposited as hydroxide of aluminum on the surface of the primary coating film, so that a secondary coating film is formed. In the present Example, due to the boehmite treatment in a solution comprising Al(OH)$_3$, hydroxide of aluminum deposited as the secondary coating film is mainly composed of Al(OH)$_3$, and the secondary coating film mainly composed of Al$_2$O$_3$.H$_2$O and Al(OH)$_3$ is obtained. The precursor is also made into Al$_2$O$_3$ by the subsequent heat treatment.

FIG. 3 is SEM images of particles with a secondary coating film formed under the conditions described above, and the solutions of the boehmite treatment of the particles shown in (A) to (E) had the following pH, respectively: (A): 6.0 to 6.4, (B): 6.0 to 6.4, (C) 7.2 to 7.6, (D) 8.0, and (E) 9.0. The particle shown in (A) is a blank sample for confirming the effect of the presence of Al ions in the solution, which was subjected to boehmite treatment with no Al(OH)$_3$ being dissolved in the solution.

In comparison between FIGS. 3 (A) and (B), it is conceivable that while a coating film is sparsely formed on the surface of the particle shown in FIG. 3 (A), a coating film is evenly formed on the surface of the particle shown in FIG. 3 (B). In other words, a coating film is evenly formed on the surface of a particle by forming a primary coating film through boehmite treatment in a solution comprising Al ions, and then causing deposition of hydroxide of aluminum on the surface of the primary coating film to form a secondary coating film.

With regard to the average diameter of the particles, the diameter after formation of the secondary coating film increases, as the pH of the solution increases. This means that as the pH of the solution during the boehmite treatment increases, the thickness of the coating film formed increases.

FIG. 4 is an X-ray diffraction chart of each of the samples shown in FIG. 3 (A) to (E). Note that an X-ray diffraction chart of Al(OH)$_3$ is also shown in the chart. As a matter of course, diffraction lines corresponding to metal Al and metal Si are observed from a core particle of Al-25 wt % Si alloy. In addition to the diffraction lines, diffraction lines of Al(OH)$_3$ can be observed in the diffraction chart of a sample (pH of treatment liquid: 9.0) shown in FIG. 3 (E). From the results, it is conceivable that Al(OH)$_3$ was deposited on the surface of the core particle through immersion in the solution with dissolved Al(OH)$_3$.

Following the step of forming the secondary coating film, a heat treatment was performed at 1150° C. for 6 hours in an oxidizing atmosphere, so that an Al oxide film was formed on the surface of the core particle to achieve microencapsulation. Through the heat treatment, Al(OH)$_3$ contained in the secondary coating film is made into a crystalline Al$_2$O$_3$ coating film according to the following reaction formula: Al(OH)$_3$→0.5Al$_2$O$_3$+1.5H$_2$O☐. Also, Al$_2$O$_3$.H$_2$O contained in the secondary coating film is made into crystalline Al$_2$O$_3$ through dissociation of moisture. Thereby not only in the case of a core particle in solid state, but also in the case of a core particle in liquid state, an oxide film which retains the molten components of a latent heat storage material inside can be obtained.

Such a heat treatment is performed, for example, as follows. First, a crucible is filled with core particles with a secondary coating film formed. The crucible is placed above the thermocouple disposed at the tip of an insertion rod, and set in a heat treatment furnace having a heater. Oxygen gas is supplied through a gas inlet of the heat treatment furnace, and the temperature of the core particles is gradually raised in the oxygen atmosphere. At a point when the temperature of the sample reached at a predetermined temperature of 880 to 1230° C. (1150° C. in the present Example), a heat treatment (oxidation treatment) is initiated and performed for 6 hours, so that the primary coating film and the secondary coating film formed on the surface of the core particle are made into α-Al$_2$O$_3$ films.

FIGS. 5 (A) to (E) are SEM images of the surface state of core particles after heat treatment of the samples shown in FIGS. 3 (A) to (E). As shown in the SEM images, a coating film of aluminum oxide is formed in any of the samples resulting from the oxidation reaction of aluminum in the primary and secondary coating films.

FIG. 6 is an X-ray diffraction chart of each of the samples shown in FIGS. 5 (A) to (E). In addition to diffraction lines corresponding to metal Al and metal Si from a core particle of Al-25 wt % Si alloy, diffraction lines from α-Al$_2$O$_3$ can be observed in any of the samples. In other words, a coating film of α-Al$_2$O$_3$ is formed by the oxidation reaction of aluminum in the primary coating film and the secondary coating film.

As described above, the Al—Si alloy with a Si content of 25 wt % has a melting point of 580° C. Although the oxidation treatment was performed at 1150° C., which is higher than the melting point, no traces of leakage of the Al—Si alloy constituting the core particles were found in the oxidation treatment step, in any of the samples after the oxidation treatment. In other words, even though the third step was performed at a heat treatment temperature higher than the melting point of the material constituting the core material, the confinement (encapsulation) of the core particle inside the shell of oxide film was achieved.

FIG. 7 is SEM images illustrating the appearance of the oxide film of each of the samples shown in FIGS. 5 (A) to (E) after implementation of 100 heating/cooling cycles (rate: 50 K/min) in the temperature range of 500 to 650° C.

It was found that the sample shown in FIG. 7 (A) (with use of a boehmite treatment liquid in which no Al(OH)$_3$ was dissolved) had insufficient capsule strength, because deformation or fracture of the α-Al$_2$O$_3$ coating film functioning as a shell was observed in a part of the products.

It was found that the sample shown in FIG. 7 (E) (with use of a boehmite treatment liquid having a pH of 9.0) tended to cause integration of particles through bonding of the α-Al$_2$O$_3$ coating films to each other. Although occurrence of such an integration causes no problem from the perspective of the capsule strength, the substantial capsule size increases, which is undesirable for practical use.

In contrast, in the samples shown in FIGS. 7 (B) to (D), fracture or the like of the oxide film or integration of the particles are not observed, with individual particles maintaining the encapsulated state.

As described above, since the samples shown in FIGS. 7 (B) to (D) were prepared using a boehmite treatment solution having a pH of 6.0 or more and less than 9.0, it is presumed that an Al oxide film excellent in cyclic resistance can be obtained by the boehmite treatment at a pH in the range.

In order to further confirm the cyclic resistance of the latent heat storage body microcapsule obtained by the process of the present invention, the sample shown in FIG. 7 (C) (with use of a boehmite treatment solution having a pH of 7.2 to 7.6) was subjected to implementation of 1000 heating/cooling cycles (rate: 50 K/min) in the temperature range of 500 to 650° C.

FIG. 8 is SEM images illustrating the appearance of the oxide film of each of the samples shown in FIG. 7 (C) after implementation of 1000 heating/cooling cycles (rate: 50 K/min) in the temperature range of 500 to 650° C. Even after 1000 cycles, the capsule maintained the initial shape, proving high performance.

[Effect of Al(OH)$_3$ Concentration in Boehmite Treatment Liquid]

In the present invention, Al ions are contained in a boehmite treatment liquid, and the primary coating film and the secondary coating film are formed by the effect of the Al ions. Accordingly, as the concentration of Al ions in the solution increases, the thickness of the coating film increases, so that thickening of a shell can be expected. In order to confirm this point, the states of the coating film formed were compared when the Al(OH)$_3$ concentration in the boehmite treatment liquid was changed.

FIG. 9 is SEM images of the respective particles with a secondary coating film formed with a different Al(OH)$_3$ content in 300 ml of the solution for use in the boehmite treatment ranging from 1 to 5 g.

The pH of any of the solutions was set at 6.0 to 6.4. A primary coating film having a composition of Al$_2$O$_3$.H$_2$O was formed on the surface of the core particle through boehmite treatment under conditions at 100° C. for 3 hours. The solution was then cooled to 75° C., i.e., the supersaturation temperature of Al ions, and maintained at the temperature for 16 hours±5 hours, such that a fraction of Al$^{3+}$ ions supersaturated in the solution was deposited as hydroxide of aluminum on the surface of the primary coating film to form a secondary coating film.

The average diameters of the samples subjected to boehmite treatment in the solutions having Al(OH)$_3$ content in 300 ml of 1 g (A), 2 g (B), 3 g (C), and 5 g (D) were 37.5 μm, 40.6 μm, 38.8 μm, and 41.4 μm, respectively. According to the comparison results, it was shown that as the Al(OH)$_3$ concentration in a boehmite treatment liquid increases, the amount of hydroxide of aluminum deposited on the surface of the primary coating film also increases, so that the thickness of the whole coating film tends to increase. When the Al(OH)$_3$ concentration of a boehmite treatment liquid is 2 g or more per 300 ml, thickening is clearly observed.

[Effect of Addition of Nucleating Agent]

Next, the effect of a nucleation accelerator as an agent to accelerate the nucleation for the formation of a coating film contained in the boehmite treatment liquid was examined. Although CH$_3$(CH$_2$)$_{11}$SO$_4$Na (NaDS: sodium dodecyl sulfate) was contained herein as the nucleation accelerator, examples other than NaDS include C$_{18}$H$_{35}$O$_2$Na (sodium stearate), CH$_3$(CH$_2$)$_{12}$CH$_2$(OCH$_2$CH$_2$)$_n$SO$_3$Na (sodium myreth sulfate), CH$_3$(CH$_2$)$_{12}$CH$_2$(OCH$_2$CH$_2$)$_n$OSO$_3$Na (sodium myreth sulfate), and CH$_3$(CH$_2$)$_{11}$(OCH$_2$CH$_2$)$_n$SO$_3$Na (sodium laureth sulfate).

FIGS. 10 (A) to (C) are SEM images of the particles after formation of the secondary coating film with amounts of sodium dodecyl sulfate added to 300 ml of solution for use in boehmite treatment of 0 mMol (no addition), 1.0 mMol and 1.8 mM, respectively.

The pH of any of the solutions was set at 6.0 to 6.4. A primary coating film having a composition of Al$_2$O$_3$.H$_2$O was formed on the surface of the core particle through boehmite treatment under conditions at 100° C. for 3 hours. The solution was then cooled to 75° C., i.e., the supersaturation temperature of Al ions, and maintained at the temperature for 16 hours±5 hours, such that a fraction of Al$^{3+}$ ions supersaturated in the solution was deposited as hydroxide of aluminum on the surface of the primary coating film to form a secondary coating film.

According to the results, the addition of sodium dodecyl sulfate to the solution clearly accelerated the formation of the coating film and increased the thickness of the coating film. It can be presumed that sodium dodecyl sulfate accelerated the nucleus formation. In other words, a thicker coating film can be formed with the addition of a nucleation accelerator.

Although experimental examples using a core particle of an Al-25 wt % Si alloy have been described so far, the present inventors performed experiments also using a core particle of Al metal alloys represented by Al-x·wt % Si, with x being 0 to 25 (in the case of x=0, metal Al), and obtained the same results. Since Al$^{3+}$ ions are supplied from the outside in the present process, the method is also effective in the case where the core particle of alloy (metal) with a composition comprising no Al.

As long as the core particle has a particle diameter of more than about 10 μm, "encapsulation" can be achieved by the method described above.

The mechanical strength of a capsule can be further enhanced by conducting finishing coating of a metal coating film or an oxide coating onto such a capsulated latent heat storage body by providing a step of a chemical process such as a sol-gel process, CVD, electroplating and electroless plating, and a physical treatment such as PVD.

As described above, in the present invention, after a primary coating film is formed on the surface of a core particle by a boehmite treatment in a solution containing Al ions, a secondary coating film is formed by cooling the solution to the supersaturation temperature of the Al ions to cause deposition of hydroxide of aluminum on the surface of the primary coating film, and an Al oxide film is formed on the surface of the core particle by heat treating the secondary coating film in an oxidizing atmosphere.

Alternatively, it is possible to subject the surface of a core particle to a chemical conversion coating treatment to form a primary coating film; treat the core particle with the primary coating film in a solution containing Al ions; cooling the solution to the supersaturation temperature of the Al ions to form a secondary coating film by deposition of hydroxide of aluminum on the surface of the primary coating film; and heat treating the secondary coating film in an oxidizing atmosphere to form an Al oxide film on the surface of the core particle.

Consequently, the shell is thickened by the amount of secondary coating film formed, so that the cyclic strength of the capsule can be secured. Also, formation of the primary coating film and the secondary coating film proceeds using Al ions in the solution as the main source of Al, so that the composition change of the PCM in the production process is remarkably suppressed. As a result, a latent heat storage body microcapsule excellent in the heat storage density and the heat conductivity, stable in the heat storage cycles and usable at a relatively high temperature, is provided.

[Microstructure of Oxide Film]

The microstructure of an oxide film is described as follows. Herein, a first oxide film (dense oxide film) and a second oxide film (porous oxide film) correspond to the "primary coating film" and a third oxide film (a porous oxide film having a different structure from the second oxide film) corresponds to the "secondary coating film". In other words, in the first step described above (chemical conversion coating treatment), the first oxide film and the second oxide film are formed at the same time. And in the second step (a step of causing deposition of hydroxide of aluminum on the surface of the primary film), the third oxide film is formed on the surface of the primary coating film. The first to third oxide films are then heat treated to make, for example, an Al$_2$O$_3$ film.

The microstructure of the oxide film formed by the process described above was analyzed by transmission electron diffraction (TEM), electron backscatter diffraction (EBSD) and the like. As a result, it was revealed that the oxide film of the latent heat storage body microcapsule obtained by the process of the present invention can have a three-layer structure in an aspect. According to the inspection results by the present inventors, the three-layer structure is observed when the particles having an appearance of accumulated or crowded micro particles or fibrous crystals as shown in FIGS. 3 (D) to (E) in the SEM images of particles after formation of the secondary coating film shown in FIG. 3 are subjected to an oxidation heat treatment.

Specifically, in such a three-layer structure, the surface of the core particle is directly coated with a dense oxide film (first oxide film) of oxide of the compositional element of the core particle (e.g., $\alpha$-$Al_2O_3$), and the surface of the first oxide film is coated with a porous oxide film (second oxide film) of an oxide of the compositional element of the core particle (e.g., $\alpha$-$Al_2O_3$). The surface of the second oxide film is coated with a porous oxide film (third oxide film) of an oxide of the compositional element of the core particle (e.g., $\alpha$-$Al_2O_3$), and the third oxide film has a structure different from the second oxide film, being, for example, a film of mixture of $\alpha$-$Al_2O_3$ and $\theta$-$Al_2O_3$.

Namely, in an aspect, the latent heat storage body microcapsule obtained by the process of the present invention can be a latent heat storage body microcapsule comprising a core particle of latent heat storage material with a surface coated with an oxide film, wherein the oxide film comprises three layers of a first oxide film directly covering the surface of the core particle, a second oxide film covering the first oxide film, and a third oxide film covering the second oxide film, wherein the first oxide film is a dense oxide film of an oxide of the compositional element of the core particle, the second oxide film is a porous oxide film of an oxide of compositional element of the core particle, and the third oxide film is a porous oxide film of an oxide of the compositional element of the core particle, having a structure different from the second oxide film.

As described above, the core particle is made of, for example, an Al alloy, and the Al alloy is, for example, an Al—Si alloy.

The oxide film of the latent heat storage body microcapsule obtained by the process of the present invention in an aspect, therefore, comprises a first oxide film being a dense film of $\alpha$-$Al_2O_3$, a second oxide film being a porous film of $\alpha$-$Al_2O_3$, and a third oxide film being a porous film in which $\alpha$-$Al_2O_3$ and $\theta$-$Al_2O_3$ mixedly. The second oxide film is a film that is formed from a fraction of $Al^{3+}$ ions supersaturated in the solution in the first step described above (step of forming a primary coating film by chemical conversion coating treatment of the surface of a core particle). Although the second oxide film is a film of $\alpha$-$Al_2O_3$ as far as the evaluation is performed by X-ray diffraction analysis, a possibility that $\theta$-$Al_2O_3$ is locally intermingled cannot be denied. In that sense, the secondary oxide film is mainly composed of $\alpha$-$Al_2O_3$. Herein, "mainly" means that only the peaks of $\alpha$-$Al_2O_3$ are identified, and even if $\theta$-$Al_2O_3$ is intermingled, the amount thereof is limited to an extent at which no diffraction peaks of $\theta$-$Al_2O_3$ can be identified.

Herein, the term "dense" in the expression of "dense oxide film" means that the film can be determined not to be porous in the TEM or SEM observation.

FIG. 11 is a drawing showing the results of TEM observation of the surface layer (Al oxide film portion) of a latent heat storage body microcapsule produced by the process of the present invention. Through high-magnification observation of the square spot shown in FIG. 11 (a), the outermost surface layer of the oxide film having a structure of deposited fine particles can be observed. From the results of electron diffraction (FIGS. 11 (c) to (d)), it was also found that, in addition to $\alpha$-$Al_2O_3$, $\theta$-$Al_2O_3$ was present in the outermost surface layer (FIG. 11 (d)).

FIG. 12 is a drawing showing the analysis results of the crystalline orientation of $Al_2O_3$ in the cross section of the latent heat storage body microcapsule by the EBSD method. As described above, the surface of the core particle is coated with an oxide film ($Al_2O_3$ film) having a three-layer structure. From the results shown in FIG. 12, it is found that in a region of the oxide film having a three-layer structure adjacent to the core particle (about 1 μm), the crystal orientation of $Al_2O_3$ is locally aligned.

Due to easy "exfoliation" of a resin used for fixing a sample in the vicinity of the surface layer of the oxide film in preparation of the cross-section sample of a latent heat storage body microcapsule for analysis by EBSD, the oxide film shown in FIG. 12 includes a (locally) missing region near the surface layer.

FIG. 13 is a chart showing the thermogravimetric analysis (TG) results for understanding the thermal reaction process including thermal decomposition when the particles after formation of the secondary coating film are subjected to the heat treatment (oxidation heat treatment) in an oxygen atmosphere. The sample was treated in a solution containing $Al(OH)_3$ at a concentration of 3.3 g/l (pH=8), having an initial weight of 110 mg. The weight shown along the left axis is the ratio to the initial weight. The SEM photographs (a to h) shown in FIG. 13 are the appearance of particles corresponding to the symbols a to h shown in the TG chart.

From the TG chart, it is found that although cracks occur in the shell at a temperature around exceeding the melting point of the core particle in the oxidation heat treatment (c to f), molten Al is oxidized to immediately self-repair the cracks. In particular, it is found that the cracks no longer exist in g and h.

FIG. 14 is SEM images showing the general views of the particles after the latent heat storage body microcapsules produced by the process of the present invention are subjected to 100 to 1000 repeating cycles in the temperature range of melting (650° C.) to solidification (500° C.) at a heating/cooling rate of 50 K/min. FIG. 14 (a) and FIG. 14 (c) relate to a latent heat storage body microcapsule treated with a solution containing $Al(OH)_3$ at a concentration of 3 g/300 ml, and FIG. 14 (b) and FIG. 14 (d) relate to a latent heat storage body microcapsule treated with a solution containing $Al(OH)_3$ at a concentration of 5 g/300 ml. From these SEM images, it can be confirmed that the shape or the like caused no change even after 1000 cycles. The samples were, therefore, further subjected to up to 3000 melting-solidification cycles.

FIG. 15 is SEM images showing the general view of the particles after implementation of up to 3000 melting-solidification cycles (heat storage/emission cycle). FIG. 15 (a) relates to a latent heat storage body microcapsule treated with a solution containing $Al(OH)_3$ at a concentration of 3 g/300 ml, and FIG. 15 (b) relates to a latent heat storage body microcapsule treated with a solution containing $Al(OH)_3$ at a concentration of 5 g/300 ml. From these SEM images, it can be confirmed that the shape or the like caused no change even after 3000 cycles. In other words, it was confirmed that these latent heat storage body microcapsules maintain the initial structure even after the 3000 heat storage/emission cycles, having practically perfect durability.

In FIG. 16, the SEM observation results of the surface of samples obtained through boehmite treatment in 300 mL of an aqueous solution with addition of 1 g of Al(OH)$_3$ (pH=8) and thermal oxidation at 1150° C. for 6 hours are shown. An approximately rectangular parallelepiped crystalline portion shown in the drawing on the right (high magnification image) corresponds to a third oxide film formed mainly from Al(OH)$_3$, and a portion thereunder (portion shown by a broken line in the drawing) corresponds to a second oxide film.

As described above, according to the present invention, a latent heat storage body microcapsule excellent in the heat storage density and the heat conductivity, stable in the heat storage cycles and usable at a relatively high temperature can be obtained.

INDUSTRIAL APPLICABILITY

The present invention provides a process for producing a latent heat storage body microcapsule, capable of thickening a shell and causing no composition change of the PCM in the production process in parallel.

REFERENCE SIGN LIST

10 Core particle
20 Oxide film
21a Primary coating film
21b Secondary coating film
100 Latent heat storage body

The invention claimed is:

1. A latent heat storage body microcapsule comprising a core particle of latent heat storage material with a surface coated with an oxide film,
   the oxide film comprising a first oxide film directly covering the surface of the core particle, a second oxide film covering the first oxide film, and a third oxide film covering the second oxide film,
   the first oxide film being a non-porous dense oxide film comprising α-Al$_2$O$_3$,
   the second oxide film being a porous oxide film, and an X ray diffraction analysis of the second oxide film showing only peaks corresponding to α-Al$_2$O$_3$, and
   the third oxide film being a porous oxide film in which α-Al$_2$O$_3$ and θ-Al$_2$O$_3$ are present mixedly, having a structure different from that of the second oxide film.

2. The latent heat storage body microcapsule according to claim 1, wherein the core particle is made of Al alloy.

3. The latent heat storage body microcapsule according to claim 2, wherein the Al alloy is an Al—Si alloy.

4. The latent heat storage body microcapsule according to claim 1, wherein the third oxide film consist of a mixture of α-Al$_2$O$_3$ and θ-Al$_2$O$_3$.

5. The latent heat storage body microcapsule according to claim 1, wherein the third oxide film does not include γ-Al$_2$O$_3$.

* * * * *